(12) United States Patent
Weres et al.

(10) Patent No.: US 11,884,540 B2
(45) Date of Patent: Jan. 30, 2024

(54) METHODS AND SYSTEMS FOR PRODUCING HYPOBROMITE BY ADDING ACID TO REACTANTS

(71) Applicant: CHEMTREAT, INC., Glen Allen, VA (US)

(72) Inventors: Oleh Weres, Reno, NV (US); Chris Baron, Newark, DE (US)

(73) Assignee: CHEMTREAT, INC., Glen Allen, VA (US)

( * ) Notice: Subject to any disclaimer, the term of this patent is extended or adjusted under 35 U.S.C. 154(b) by 0 days.

(21) Appl. No.: 17/831,945

(22) Filed: Jun. 3, 2022

(65) Prior Publication Data
US 2022/0388843 A1 Dec. 8, 2022

Related U.S. Application Data

(60) Provisional application No. 63/196,831, filed on Jun. 4, 2021.

(51) Int. Cl.
*C01B 11/20* (2006.01)
*B01J 19/00* (2006.01)

(52) U.S. Cl.
CPC ........... *C01B 11/20* (2013.01); *B01J 19/0006* (2013.01); *B01J 2219/00186* (2013.01)

(58) Field of Classification Search
CPC .............. C01B 11/20; B01J 19/0006; B01J 2219/00186; B01J 2219/00063; B01J 2219/00065; B01J 2219/00175; B01J 2219/00177; B01J 14/00; B01J 19/0033; B01J 19/0066; B01J 19/0086
See application file for complete search history.

(56) References Cited

U.S. PATENT DOCUMENTS

| 1,781,415 A | 11/1930 | Smith et al. |
| 5,422,126 A * | 6/1995 | Howarth ................. C01B 11/20 424/661 |

OTHER PUBLICATIONS

Kumar et al. "Kinetics and Mechanism of Gerneral-Acid-Assisted Oxidation of Bromide by Hypochlorite and Hypochlorous Acid", Inorganic Chemistry, vol. 26, No. 16, 1987, pp. 2706-2711.

* cited by examiner

*Primary Examiner* — Anthony J Zimmer
*Assistant Examiner* — Syed T Iqbal
(74) *Attorney, Agent, or Firm* — Oliff PLC; Oleh Weres

(57) ABSTRACT

The reaction of sodium hypochlorite with sodium bromide is slow, and commonly only part of the bromide is converted to hypobromite. Methods to accelerate the reaction by adding a regulated amount of acid to a solution comprising bleach and bromide are provided, whereby the yield of hypobromite can be increased. The amount of acid added can be predetermined based on the content of a base in the bleach, and acid can be added to neutralize the base. The amount of acid added can be based on a measured parameter of the reaction that is indicative of reaction kinetics. For example, the amount of acid can be actively controlled by measuring pH, absorbance of visible or near Ultraviolet light, or temperature of the reacting solution and adjusting acid.

21 Claims, 13 Drawing Sheets

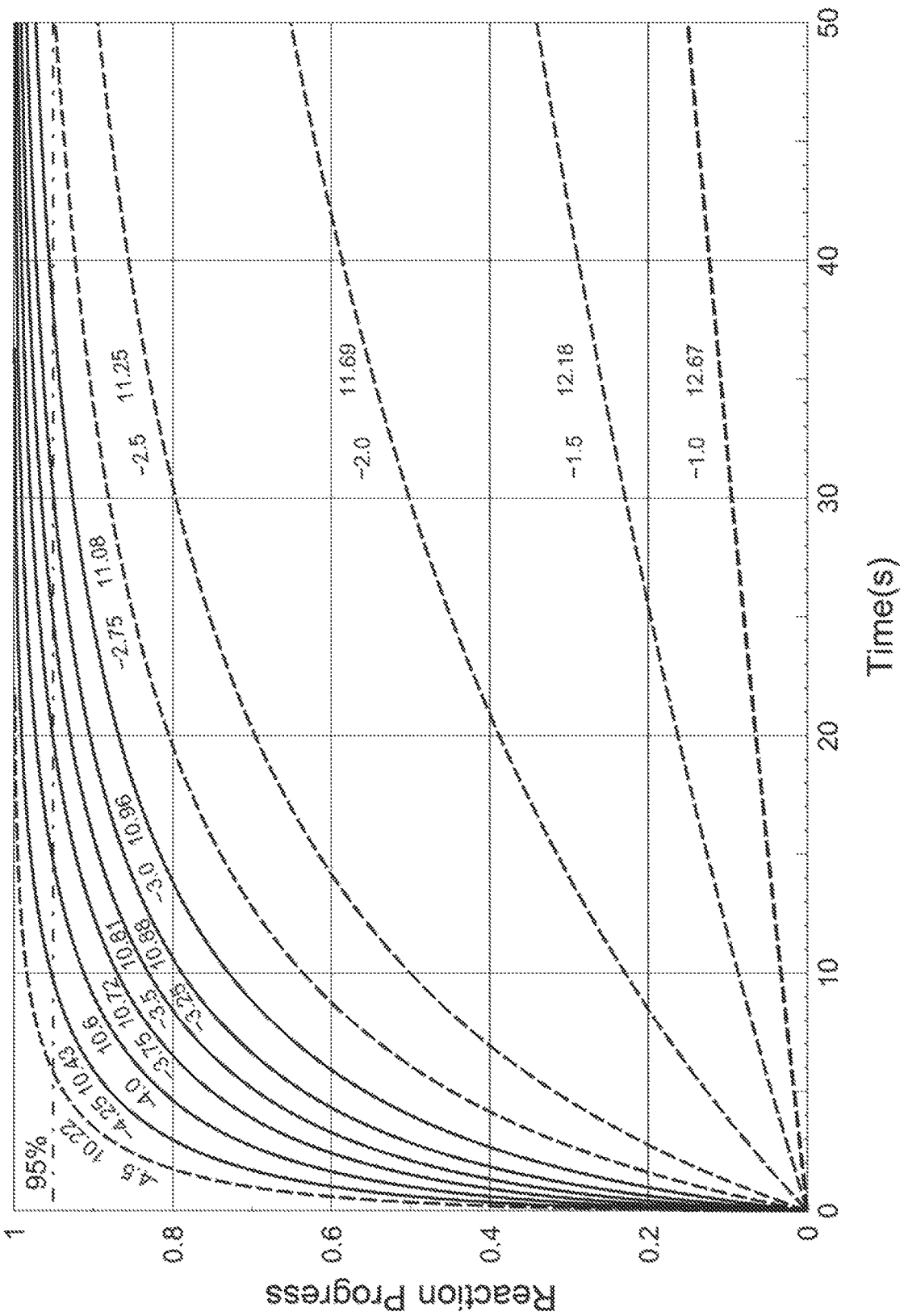

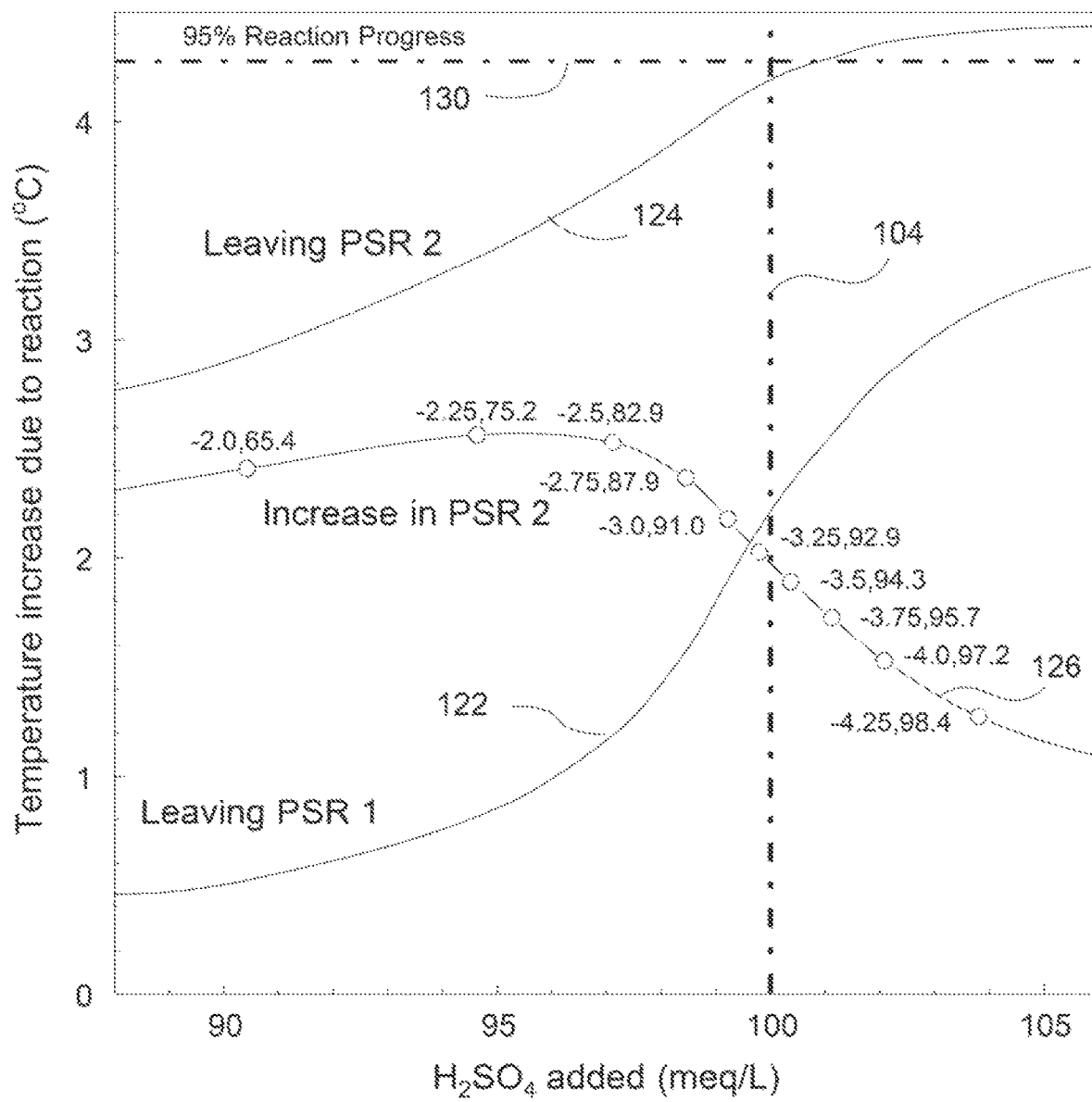

METHODS AND SYSTEMS FOR PRODUCING HYPOBROMITE BY ADDING ACID TO REACTANTS

FIELD OF THE INVENTION

This disclosure relates generally to methods for producing hypobromite by reacting hypochlorite and bromide, and in particular to methods for accelerating this reaction and increasing the yield of hypobromite by adding a regulated amount of acid to the reaction solution.

BACKGROUND

Hypobromous acid (HOBr) and hypobromite anion ($OBr^-$) are more effective biocides than hypochlorous acid (HOCl) and hypochlorite anion ($OCl^-$) Likewise, monobromamine ($NH_2Br$) produced by reaction of HOBr with ammonia in the water treated is a more effective biocide than monochloramine ($NH_2Cl$). Sodium hypobromite can be produced by reacting bleach containing sodium hypochlorite with sodium bromide. One technique of producing sodium hypobromite is to combine a solution of sodium bromide with bleach containing a modest excess of sodium hypochlorite in a tank.

Sodium hypobromite is also produced in a continuous manner by combining pumped streams of sodium bromide solution and bleach, usually with added water for dilution. However, the reaction of hypochlorite ion with bromide to produce hypobromite is slow, and the resulting yield of sodium hypobromite often is small.

Sodium hydroxide is added to bleach to slow decomposition of sodium hypochlorite. Industrial bleach commonly contains about 1.76 mols/L of sodium hypochlorite ("12.5% active chlorine"), an equal concentration of sodium chloride, and typically 4 to 10 g of NaOH per liter, which is sufficient to induce room temperature pH of 13 or higher.

The reaction of bromide ion with hypochlorite ion producing hypobromite and chloride is very slow due to electrostatic repulsion of the two anions:

$$Br^- + OCl^- \rightarrow Cl^- + OBr^- \qquad (1)$$

Reaction of bromide with hypochlorous acid is very much faster, and is the major pathway producing hypobromous acid (Ref. 1):

$$Br^- + HOCl \rightarrow Cl^- + HOBr \qquad (2)$$

In the presence of NaOH, nearly all of the hypochlorite is actually present as hypochlorite with only a very small amount of hypochlorous acid. Thus, the second reaction contributes little, and commonly only a fraction of the bromide is converted to hypobromite before the reacting mixture is discharged to the water being treated.

Although activating bleach by decreasing pH has long been known in special applications; for example, adding sodium bicarbonate to bleach used to bleach wool (See, e.g., U.S. Pat. No. 1,781,414 and subsequent related patents), it has been emphatically and widely taught that acid should not be added to bleach because adding too much acid to bleach can produce deadly fumes of HOCl and chlorine. This widespread conventional wisdom has militated against the idea of adding acid to bleach solutions. Likewise, adding too much acid to a solution containing HOBr can generate fumes of $Br_2$, especially if some unreacted bromide ion is present as well.

SUMMARY

Contrary to conventional practices, it was surprisingly discovered in connection with this disclosure that adding acid to a mixture of bleach and bromide salt accelerates the reaction of bleach and bromide. Further, adding acid can be particularly effective if the amount of acid added is properly predetermined or controlled. In some aspects, the reaction producing hypobromite can be accelerated to the point of reliably converting nearly all of the bromide provided to hypobromite by adding some acid to the mixture of bromide salt and bleach, which causes at least some of the hypochlorite to be protonated to HOCl. Protonating just a small fraction of the hypochlorite can induce fast reaction. The hypobromite can then be used, for example, as a biocide to treat water.

According to one aspect of this disclosure, there is provided a method for producing hypobromite that includes combining together bromide, hypochlorite, and acid to provide a reaction mixture, and reacting the reaction mixture to form hypobromite.

According to another aspect of this disclosure, there is provided a method for producing hypobromite in a reactor, where the method includes adding bromide, bleach which includes a base, and acid to the reactor as a reaction mixture, reacting the reaction mixture to form hypobromite, measuring a parameter of the reaction mixture that is indicative of at least one of a rate of reaction and a reaction progress, and controlling an amount of acid that is added to the reactor based on the measured parameter.

According to yet another aspect of this disclosure, there is provided a system for producing hypobromite that includes a reactor, a bromide feed that supplies bromide to the reactor continuously, a bleach feed that supplies bleach to the reactor continuously, an acid feed that supplies acid to the reactor, a sensor that measures a parameter that is indicative of at least one of a rate of reaction and reaction progress, and generates a signal based on the measured parameter, and a controller that is programmed to control an amount of the acid that is supplied to the reactor based on the signal that is generated by the sensor.

BRIEF DESCRIPTION OF THE DRAWINGS

FIG. 1 is a graph illustrating how the initial value of log $m(OH^+)$ can control the rate of hypobromite reaction;

FIG. 10 is a graph illustrating theoretical temperature increases due to the chemical reaction in the reactor system of FIG. 9B;

DETAILED DESCRIPTION

Figure 2A:
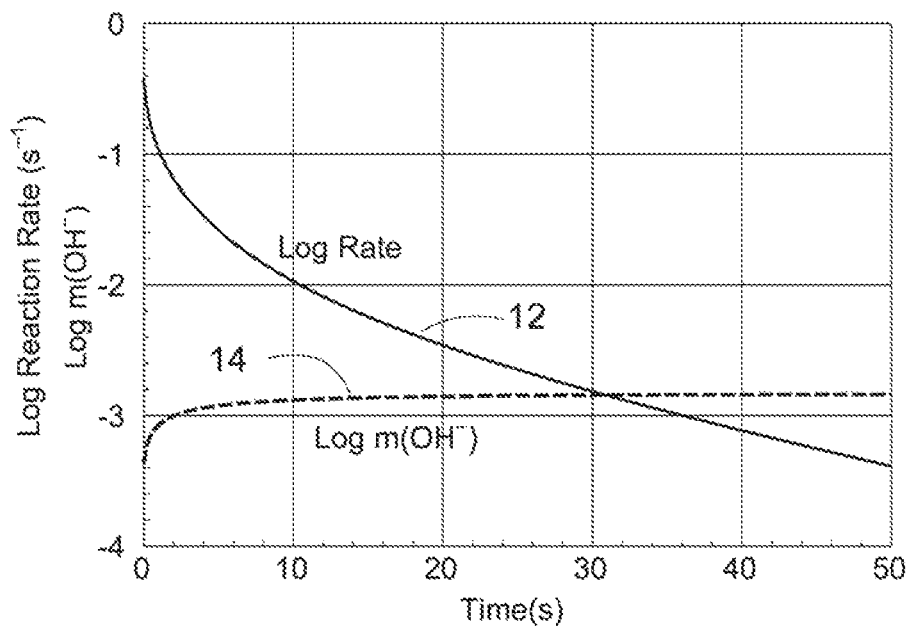
FIGS. 2A-2D are graphs that illustrate different properties of the hypobromite reaction over the course of the reaction.

Definitions of certain terms used in this disclosure are explained below.

$a_w$ is the activity of water, a function of temperature and ionic strength. The value of $a_w$ can be calculated using the value of the osmotic coefficient. The osmotic coefficient of sodium chloride solution may be used as a good approximation of the osmotic coefficient of the reacting solution.

Unless stated otherwise, "Concentration of X" as used in this document is expressed in molal units; that is, g-mols X per kg of water in the solution.

"Discharge" means the point at which the solution leaves the pipeline or reactor and is added to the water being treated.

"Fraction converted" refers to the fraction of bromide initially present to hypobromite at a certain location or time.

By "initial value" is meant the value of log $m(OH^-)$ that would exist immediately after the chemicals and water are thoroughly mixed, but before any reaction has taken place. This state of the reacting solution is hypothetical, because the reaction would begin before mixing is complete, increasing log $m(OH^-)$. As a practical matter, the initial value of log $m(OH^-)$ can be closely approximated, and the corresponding value of pH measured, by combining bleach and water in the proportions desired and adding an equivalent amount of NaCl in place of NaBr.

$m(OH^-)$ is concentration of hydroxide ion in molal units. The notation "m(X)" is similarly used to represent the molal concentration of species X.

$m(Hc)=m(HOCl)+m(OCl^-)$ is the total concentration of hypochlorite in the reacting solution.

$m(Hb)=m(HOBr)+m(OBr^-)$ is the total concentration of hypobromite in the reacting solution.

pH is minus the logarithm of the activity of $H^+$ and is commonly measured using a pH meter together with a glass membrane electrode or ion specific field effect transistor electrode.

$pH_m$ is minus the logarithm of $m(H^+)$. Thus defined, $pH_m$ is closely related to, but not the same as pH. Unlike pH, $pH_m$ can be calculated without using single ion activity coefficients needed to calculate pH.

$pK_w$ is the minus the logarithm of the equilibrium constant for dissociation of water, a function of temperature and ionic strength.

$pK_a(HOCl)$ is the minus the logarithm of the equilibrium constant for dissociation of HOCl, a function of temperature and ionic strength.

"Rate of reaction" means the rate at which $OBr^-$ is produced by the reaction. $Br^-$ and HOCl are consumed and $Cl^-$ produced at the same rate.

"Reaction Progress" is the fraction of bromide ion converted to hypobromite as a function of time, analogous to "Fraction Converted".

$Q_{HOCl}$ is the equilibrium constant for reaction of HOCl with $OH^-$ written in terms of molal concentrations of HOCl and $OH^-$ and the activity of water. Because this reaction is isocoulombic, $Q_{HOCl}$ depends weakly on ionic strength, and may be assumed to be independent of ionic strength. This assumption is implicit in Eq. (8b) which provides an expression for $Q_{HOCl}$ in terms of $pK_w$ and $pK_a$ which properly describe equilibria at zero ionic strength.

$Q_{HOBr}$ similarly describes the reaction of HOBr with $OH^-$.

$Q_w=m(OH^-) m(H^+)$ is the ion product of water, a function of temperature and ionic strength.

"Summed vapor pressure" is the sum of vapor pressures of $Br_2$, BrCl, $Cl_2$, HOBr and HOCl.

"Vapor pressure" without a modifier generally is used in the sense of "summed vapor pressure" as defined above.

"Vapor pressure of hazardous species" means the same as "summed vapor pressure".

In connection with this disclosure, the inventors discovered that adding acid to a mixture of bleach and bromide can unexpectedly increase the reaction rate and improve the yield of hypobromite. In particular, where the amount of acid is properly predetermined and/or actively controlled, the rate of reaction can be increased to the point of allowing practically complete conversion of bromide to hypobromite and without generating significant vapor pressure of the hazardous volatile compounds, i.e., HOCl, HOBr, $Cl_2$, $Br_2$ or BrCl.

While hypobromite is most often produced by reacting bleach containing NaOCl with a solution of NaBr, it should be understood that solutions comprising other hypochlorite salts and bromide salts can be used in connection with the invention, e.g., reacting KOCl with KBr. The NaCl present in bleach plays no role, and need not be present in the reacting solution at the start of the reaction. The bleach reactant that is added to the reaction mix can be industrial bleach having a 12.5% $Cl_2$ equivalent concentration. However, other concentrations of bleach can be added, such as from 1% to 30% $Cl_2$ equivalent concentration, from 5% to 20% $Cl_2$ equivalent concentration, or from 10% to 15% $Cl_2$ equivalent concentration.

It is believed that adding acid to the reaction mixture will neutralize some of the base that is present in the bleach and cause at least some of the hypochlorite to be protonated to HOCl. Accordingly, in embodiments, the bleach that is added to the reaction mixture can include base in amounts of from 0.5 g/L to 50 g/L, from 1 g/L to 25 g/L, from 2.5 g/L to 20 g/L, or from 5 g/L to 15 g/L. The base is typically present as NaOH, although other bases can be present.

The bromide salt used in the reaction can be added as an aqueous solution having a concentration that is in a range of from 5 wt. % to 65 wt. %, from 20 wt. % to 50 wt. %, or from 30 wt. % to 45 wt. %.

The bromide solution and the bleach can be added in the reaction mixture in a volume ratio that is in the range of 0.1:1 to 20:1, 0.5:1 to 15:1, or 1:1 to 5:1, for example. Water may also be separately added to the reaction, e.g., in similar volume amounts as the reactant solutions combined.

Because the rate of reaction is a function of the concentration of hydroxide ion, it can be controlled to adding an amount of acid that will give $m(OH^-)$ (concentration of hydroxide ion in molal units) which enables good yield of hypobromite without generating hazardous fumes. This proper amount of acid can be predetermined in several ways described in the Examples below, including but not limited to titrating the bleach to determine the amount of NaOH present and adding an equivalent or slightly greater amount of acid. Modeling chemical kinetics allows the amount of acid added to be determined in a precise manner. In some embodiments, the initial $m(OH^-)$ after addition of the acid can be, for example, less than −1.5, from −2 to −6, from −3 to −5, from −3.3 to −4.5, or from −3.5 to −4.25. Depending on the type of acid used, the amount of base in bleach, other bases/acids in the water, etc., the amount of acid can be added in a range of, for example, from 5 meq/L to 100 meq/L, from 10 meq/L of 75 meq/liter, or from 25 meq/L to 50 meq/L.

Any suitable acid that will neutralize base present in the bleach can be used. While sulfuric acid, carbon dioxide, and/or sodium bicarbonate may be preferred in some applications, many other acids may be used; for example, but not limited to boric acid, phosphoric acid, acetic acid, or hydrochloric acid. The acid may be selected so that it does not react (aside from exchanging protons) with other constituents of the reacting solution, e.g., undesired reactions with hypochlorite and other reactive constituents of the reacting solution. If hydrobromic acid is used, it will also replace part of the NaBr needed. Acid salts, for example, monosodium phosphate or sodium bisulfate can also be used, and are considered acids for the purposes of this disclosure.

Sulfuric acid may be preferred in embodiments and may be the least expensive choice of acid. Sodium bicarbonate can be used without safety hazards related to using sulfuric acid. Using sodium bicarbonate would create a buffered solution, whereby an excess of sodium bicarbonate would generate significantly smaller vapor pressure of hazardous fumes than would an excess of sulfuric acid. Carbon dioxide can also be used, and would be intermediate between sulfuric acid and sodium bicarbonate in this regard. Another advantage of using sodium bicarbonate (or another bicarbonate salt) or carbon dioxide is that the bicarbonate ion catalyzes the reaction producing hypobromite, whereby the rate of reaction would be greater than with sulfuric acid at the same value of log $m(OH^-)$ and the same vapor pressure of volatile species.

As explained in the Examples which follow, acid feed can be actively controlled by measuring pH, absorbance of visible or near ultraviolet light, or temperature of the reacting solution and adjusting acid feed to maintain the measured parameters within a predetermined range which corresponds to the fraction of bromide converted to hypobromite desired.

The method described can be operated to provide at least 50% conversion of bromide to hypobromite, at least 70% conversion, at least 75% conversion, at least 80% conversion, at least 85% conversion, at least 90% conversion, at least 95% conversion, at least 98% conversion, at least 99% conversion, from 99% to 99.9%, or another such predetermined value. Depending on the amount of acid and dilution/motive water used, the final concentration of $m(Hb)$ can be in a range of 0.25 to 1.5 moles/L, from 0.5 to 1.4 moles/L, or from 1 to 1.32 moles/L.

The acid feed can be controlled to be added continuously, periodically, or intermittently based on the measured rate of reaction or the Reaction Progress. The rate of reaction or Reaction Progress can be evaluated at one or more points in the reactor by measuring at least one of the parameters identified above (e.g., temperature increase, pH, absorbance, etc.). These parameters can be measured with probes, sensors, or transducers, that send signals to a controller through a communication network (wired or wireless connections). The controller may include a computer with a memory and processor (e.g., CPU) that is programmed with software to calculate the amount of acid feed that should be added based on the measured parameter(s). The controller can calculate reaction rate, Reaction Progress or other properties of the reacting solution that is used to generate a control signal that is used to add acid to the reactor. For example, the controller can generate a signal that is effective to control a valve or pump to introduce the calculated amount of acid into the reactor. The controller can be programmed to add a sufficient amount of acid to keep the measured parameter within a predetermined range, or to keep the calculated reaction rate or Reaction Progress within a predetermined range or above a predetermined threshold.

All of the calculations described or referred to herein can be performed using a computer program written in Python, Fortran, C++ or another computer language known to persons having ordinary skill in the art of scientific programming. The resulting program can be run on a personal computer or a mainframe computer, and drawing figures presenting the results can be generated using commercially available computer programs, or a program written for that purpose.

FIG. 1 illustrates how the initial value log $m(OH^-)$ controls the rate of reaction. A mixture of 12.5% $Cl_2$ equivalent bleach containing 10 g/L NaOH, 40 weight % solution of NaBr, and water in the volume proportions 40:10:50 is modeled. Sulfuric acid is added to produce the initial value of log $m(OH^-)$ desired. Each curve is labeled with the corresponding initial value of log $m(OH^-)$ which is determined by adding the appropriate amount of sulfuric acid. Each curve is also labeled with the final value of $pH_m$, which may be used to relate Reaction Progress to pH measured with an electrode. The horizontal broken line indicates 95% reaction progress. The solid curves are ones where Reaction Progress is 95-99.5% at 40 seconds. The initial value of log $m(OH^-)$ can be modeled and the initial value calculated used to determine the mixing ratios needed to give the desired rate of reaction. The significance of the initial value of log $m(OH^-)$ and the final value of $pH_m$ and how these values are used is further explained in Examples 2 and 7 below.

Figure 2B:
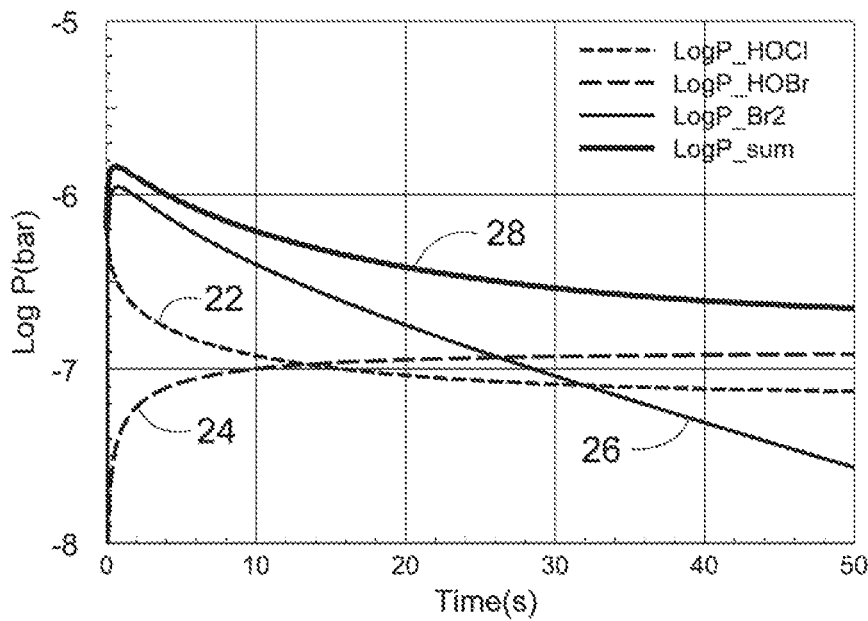
Figure 2C:
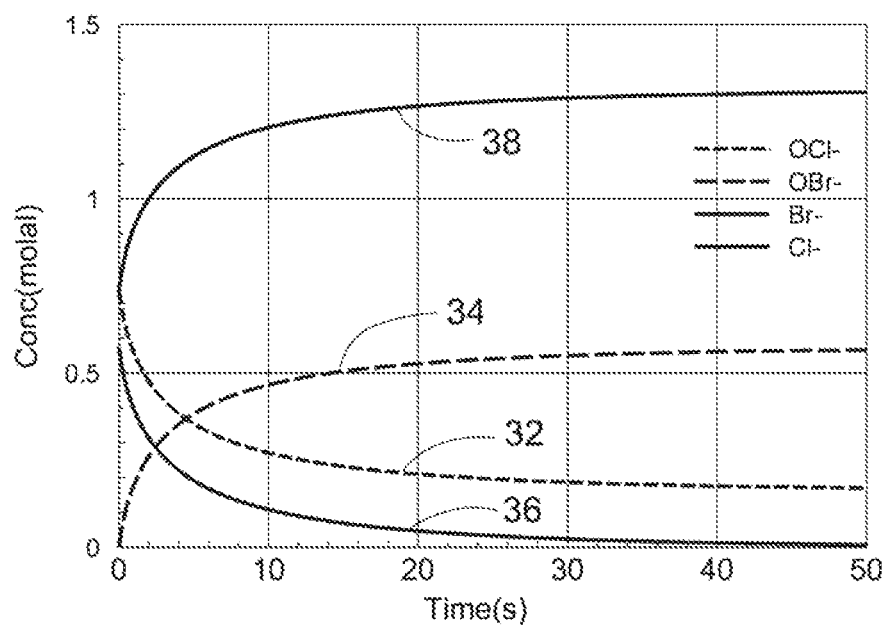
Figure 2D:
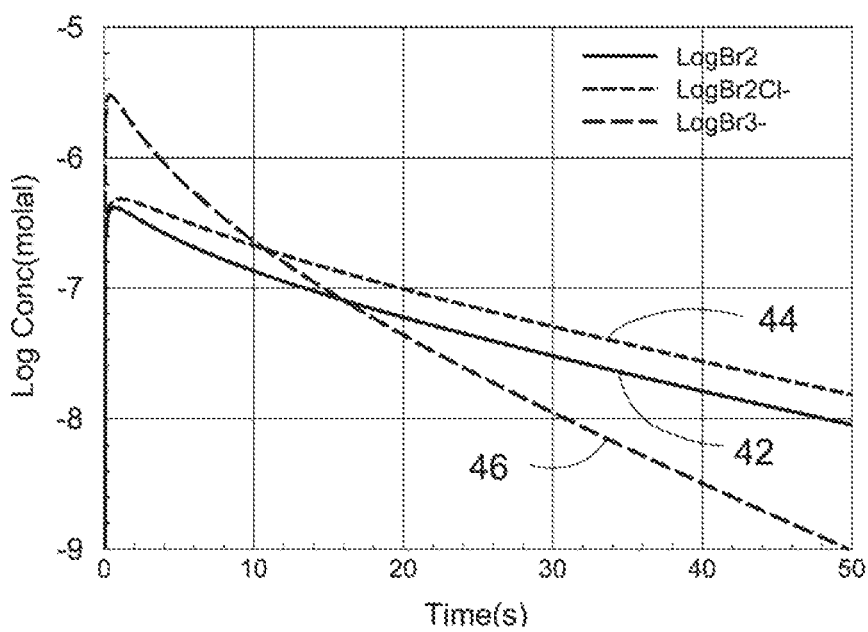

FIGS. 2A-2D illustrate the course of a typical reaction where sulfuric acid is added to the reaction mixture to neutralize base that is present in the bleach. Specifically, 12.5% bleach containing 4 g/L NaOH is combined with 40 weight % NaBr and water in the volume proportions 40:10:50, and 20 mg-mols/liter=40 meq/liter sulfuric acid is added to neutralize NaOH in the bleach. At time=0, the initial value of log $m(OH^-)$=−3.37 governed by the hydrolysis of NaOCl. FIG. 2A illustrates reaction rate 12 and the value of log $m(OH^-)$ 14 as the reaction proceeds. The rate of reaction drops as bromide and hypochlorite react to produce chloride and hypobromite. Log $m(OH^-)$ increases as the reaction progresses because NaOBr hydrolyzes to a greater degree than does NaOCl. FIG. 2B illustrates vapor pressure of volatile species as the reaction progresses. Curves 22 and 24 are the vapor pressure (bar) of HOCl and HOBr, respectively; 26 is the vapor pressure of $Br_2$, and 28 is the summed vapor pressure of these species. The vapor pressure of $Cl_2$ and BrCl is much smaller. Elemental bromine contributes most to the summed vapor pressure of hazardous species in the early part of the reaction. Vapor pressure peaks at 0.57 seconds reaction time, where the summed vapor pressure is antilog (−5.84)=1.45 microbar=1.45 ppmv. FIG. 2C illustrates the concentration of major species as the reaction proceeds. Curves 32 and 34 are the molal concentrations of $OCl^-$ and $OBr^-$ respectively, and 36 and 38 are the concentrations of $Br^-$ and $Cl^-$. FIG. 2D illustrates the concentration of halogen species as the reaction progresses. Curves 42, 44 and 46 are logarithms of molal concentration of $Br_2$, $Br_2Cl^-$ and $Br^-$ in the solution. The concentrations of $Cl_2$, $Cl_3^-$ and $BrCl_2^-$ are much smaller.

Figure 3A:
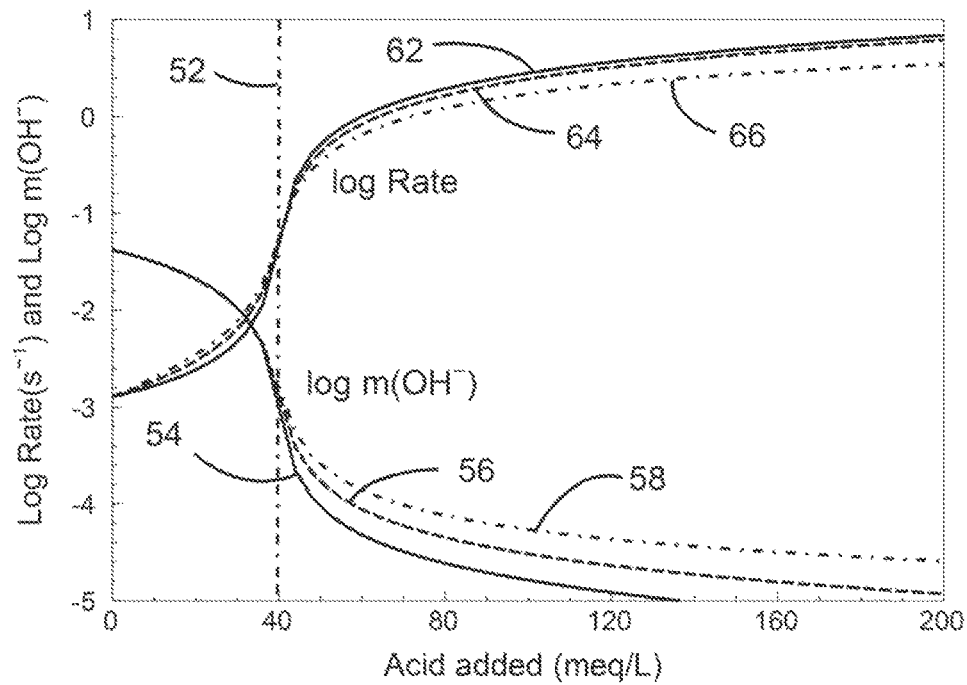
FIGS. 3A and 3B are graphs that illustrate the effect of adding $H_2SO_4$, $CO_2$ and $NaHCO_3$ in amounts that are greater than needed to neutralize the NaOH present in the bleach.
Figure 3B:
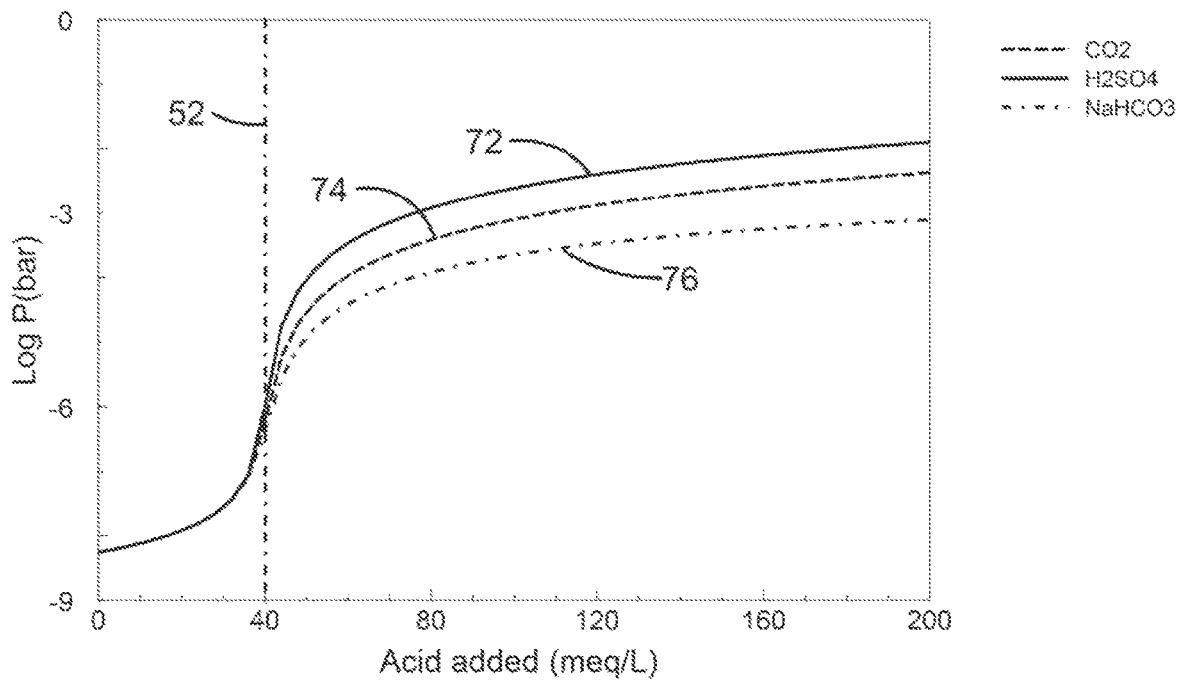

FIGS. 3A and 3B illustrate the effect of adding $H_2SO_4$, $CO_2$ and $NaHCO_3$ in amounts up to five times greater than needed to neutralize NaOH in the bleach. The same mixture of bleach, NaBr and water was modeled as with FIG. 2, and in each Figure vertical dashed line 52 indicates the amount of acid needed to fully neutralize the NaOH in the bleach, i.e., for the composition modeled in FIG. 2. The values of log reaction rate, log m(OH$^-$) and vapor pressure plotted describe the solution at 50% Reaction Progress, which is the point in time where 50% of the bromide has been converted to hypobromite. In FIG. 3A curves 54, 56 and 58 respectively represent log m(OH$^-$) when $H_2SO_4$, $CO_2$ and $NaHCO_3$, are added. Curves 62, 64 and 66 respectively represent logarithm of Reaction Rate when $H_2SO_4$, $CO_2$ and $NaHCO_z$ are added. In FIG. 3B curves 72, 74 and 76 respectively represent the sum of vapor pressure of volatile species (other than water and $CO_2$) when $H_2SO_4$, $CO_2$ and $NaHCO_3$ are added. In all cases where total vapor pressure exceeds 1 microbar (=1 ppmv) the major volatile species present is $Br_2$.

This modeling demonstrates that overfeeding acid increases reaction rate and vapor pressure, but the curves quickly flatten out. In each case, the solution is strongly buffered by hypochlorite and hypobromite, which combine with protons from the acid to produce the corresponding acids, HOCl and HOBr. Additional buffering is provided by the couple $HCO_3^-/CO_3^{-2}$ when $CO_2$ or $NaHCO_3$ serves as the acid, whereby the decrease in log m(OH$^-$) is less pronounced than with $H_2SO_4$. Likewise, the summed vapor pressure of hydrohalous and hypohalous acids is in the order $NaHCO_3 < CO_2 < H_2SO_4$. At 5× overfeed (200 meq acid added) the vapor pressure with $NaHCO_3$ is only 0.77 mbar, which is 17 times smaller than the 13.3 mbar vapor pressure with $H_2SO_4$. However, the rate of reaction with $CO_2$ is practically the same as with $H_2SO_4$, and only slightly smaller with $NaHCO_3$ because $HCO_3^-$ has an additional catalytic effect which increases the rate of reaction.

The effect of adding acid to a solution comprising bleach and sodium bromide is summarized in the Table 1 below, which is based on modeled data. The reacting solution presented as an example and in FIGS. 1, 5, 6, 7 and 8 comprises a mixture of 12.5% $Cl_2$ equivalent bleach containing 10 g/L NaOH, 40 weight % solution of NaBr, and water in the volume proportions 40:10:50 plus sulfuric acid to produce the initial value of log m(OH$^+$) desired.

TABLE 1

| $H_2SO_4$ (mN) | NaOH Remaining (mN) | Excess $H_2SO_4$ (mN) | Excess $H_2SO_4$/ HOCl (meq/mmol) | log m(OH$^-$) (molal) | pH$_m$ Final | Progress at 40 sec (%) |
|---|---|---|---|---|---|---|
| 116.4 | 0 | 16.4 | 2.33e−2 | −5 | 9.71 | 100 |
| 105.2 | 0 | 5.2 | 7.43e−3 | −4.5 | 10.22 | 100 |
| 102.9 | 0 | 2.9 | 4.15e−3 | −4.25 | 10.43 | 99.9 |
| 101.6 | 0 | 1.6 | 2.22e−3 | −4 | 10.6 | 99.6 |
| 100.8 | 0 | 0.8 | 1.08e−3 | −3.75 | 10.72 | 99.0 |
| 100.2 | 0 | 0.2 | 3.25e−4 | −3.5 | 10.81 | 98.2 |
| 100 | 0 | 0 | 0 | −3.37 | 10.85 | 97.7 |
| 99.8 | 0.2 | 0 | 0 | −3.25 | 10.88 | 97.2 |
| 99.2 | 0.8 | 0 | 0 | −3 | 10.96 | 95.5 |
| 98.4 | 1.6 | 0 | 0 | −2.75 | 11.08 | 92.2 |
| 97 | 3 | 0 | 0 | −2.5 | 11.25 | 85.6 |
| 90.4 | 9.6 | 0 | 0 | −2 | 11.69 | 58.6 |
| 69.8 | 30.2 | 0 | 0 | −1.5 | 12.18 | 28.9 |
| 44.1 | 55.9 | 0 | 0 | −1 | 12.67 | 12.4 |

Because the reacting solution initially contains 100 meq/liter of NaOH, adding 100 meq/liter of sulfuric acid precisely neutralizes the NaOH, and the concentration of OH$^-$ is then controlled by hydrolysis of OCl$^-$ with log m(OH$^-$) =−3.37. In this case, 97.7% of NaBr is converted to NaOBr at 40 seconds reaction time, and the pH$_m$ of the solution is 10.85 once the reaction has gone to completion. If the amount of acid added is less than needed to fully neutralize NaOH, some NaOH remains in solution, log m(OH$^-$)>−3.37 and the fraction of NaBr converted is smaller. Conversely, if the amount of acid added exceeds the amount needed to neutralize NaOH, the excess acid will protonate additional OCl$^-$ producing HOCl and the fraction of NaBr converted will increase.

The actual amount of acid added is not the controlling parameter—instead, the amount above or below that needed to neutralize NaOH controls. The results in this Table were generated in reference to a specific reacting solution; however, similar Tables can be generated for reacting solutions with different initial compositions (e.g., due to manufacturer variation in compositions or variations due to decomposition), and the trends will be similar. Where the only difference is the amount of NaOH in the bleach, there is no need to generate another Table; in such cases the first column can be ignored and the rest will be unchanged. This similarity allows the results presented in FIG. 3 to be usefully combined with the results in FIG. 1 and related Figures.

Several prospective examples of embodiments of the invention are described in detail below. These examples show that the reaction of bleach with bromide ion to produce HOBr and OBr$^-$ can be accelerated to improve reaction yield by adding acid to the reacting solution. The summed vapor pressure of hazardous species generated by adding acid sufficient to provide fast reaction is relatively small, and the possible hazard can easily minimized or controlled. The amount of acid added can be properly predetermined and/or controlled in order to provide fast reaction safely.

The ability to safely combine acid with bleach to provide a beneficial result is surprising and unexpected, contrary to conventional wisdom and oft-repeated warnings and advice.

Sometimes alkalinity and pH of the water being treated increases to undesirable levels due, at least in part, to base (e.g., NaOH) contained in bleach used to treat the water, and acid can be added to maintain acceptable pH. Adding acid to neutralize the NaOH in bleach in order to accelerate reaction with NaBr will also serve to maintain the reaction mixture at an acceptable pH. In cases where acid is added to maintain the pH, it may no longer be necessary to have a separate acid feed system where the acid is added to accelerate the reaction.

The calculations and results represented in the Examples described below and the results presented are modeled and are necessarily imperfect. Likewise, the proposed mechanisms are theoretical, and should not be considered to limit the invention. Nonetheless, the calculations and results should be sufficient to apply embodiments of the invention to practical applications, particularly with a suitable margin of error applied.

Although the description in the Examples contains many specificities, these should not be construed as limiting the scope of the invention but merely as providing examples of some of the presently preferred embodiments. Thus the scope of the invention should be determined by the appended claims and their legal equivalents, rather than by the examples given. The scope of the invention is not limited to the methods described here, and should be understood to include other methods of comparable effect. The examples described herein are based on mathematical modeling and should be understood to be prospective examples.

Example 1

Predetermine the Amount of Acid to Add by Titrating the Bleach

Table 1 above illustrates that the preferred amount of acid added would be just the amount needed to fully neutralize NaOH introduced with the bleach or slightly more. An excess of 1.6 meq/liter would increase conversion at 40 seconds from 97.7 to 99.6%. The maximum pressure of volatile species would increase, but would still be very small, about 10 microbar=10 ppmv total pressure (as shown in FIG. 8B). The final vapor pressure, after the reaction has run to completion, would be about 0.35 microbar=0.35 ppmv. This amount of Excess Acid would protonate just 0.223% of the $OCl^-$ in solution.

The amount of acid needed to hit this "sweet spot" can be predetermined by first titrating or otherwise analyzing the bleach to determine the concentration of NaOH and NaOCl in the bleach. Such a titration would be well-known to a person having ordinary skill in the art. An analytical procedure that distinguishes between NaOH and $Na_2CO_3$ (which usually is present as well) can be employed, and if the water used to formulate the reacting solution contains a significant amount of acid or OH, the amount of acid needed to neutralize NaOH will be different. Even weak acids present in the water will consume some of the NaOH; for example, bicarbonate, $CO_2$, boric acid or silica.

To produce log $m(OH^-)$ and achieve conversion as described in the preceding paragraph, acid can be added in the amount of $$\text{Acid Added(eq)} = \text{NaOH(mols)} + 0.00223 \times \text{NaOCl (mols)} \quad (3)$$

where the amounts of NaOH and NaOCl are the amounts contained in the bleach added to the reacting solution.

The factor 0.00223 is used to illustrate the method; a similar small value can be substituted with similar practical results. Because this coefficient is small, the amount of NaOCl can be estimated rather than determined by titration; for example, it can be set equal to concentration of NaOCl (proportional to "active $Cl_2$") specified by the supplier multiplied by the volume of bleach used. Indeed, simply Adding Acid equal to the amount of NaOH introduced with the bleach usually will give acceptable results. This is a simple way to practice embodiments of the invention and can serve as a starting point for realizing the other embodiments described below.

Alternatively, once the bleach has been properly analyzed, the precise amount of acid needed to achieve the desired result can be determined by modeling chemistry of the reacting solution as described in Example 8 below.

Example 2

Amount of Acid Added Predetermined or Controlled by Measuring Absorbance of Ultraviolet or Visible Light Simply predetermining the amount of acid added as described in the preceding Example or otherwise, may not provide reliable real-time process control because variations in pump speed and composition of the bleach used would render precise control difficult. In other embodiments of the invention, the neutralization of sodium hydroxide can be actively controlled, with acid feed continuously adjusted to keep the fraction of NaBr converted to NaOBr within the range desired.

Figure 4:
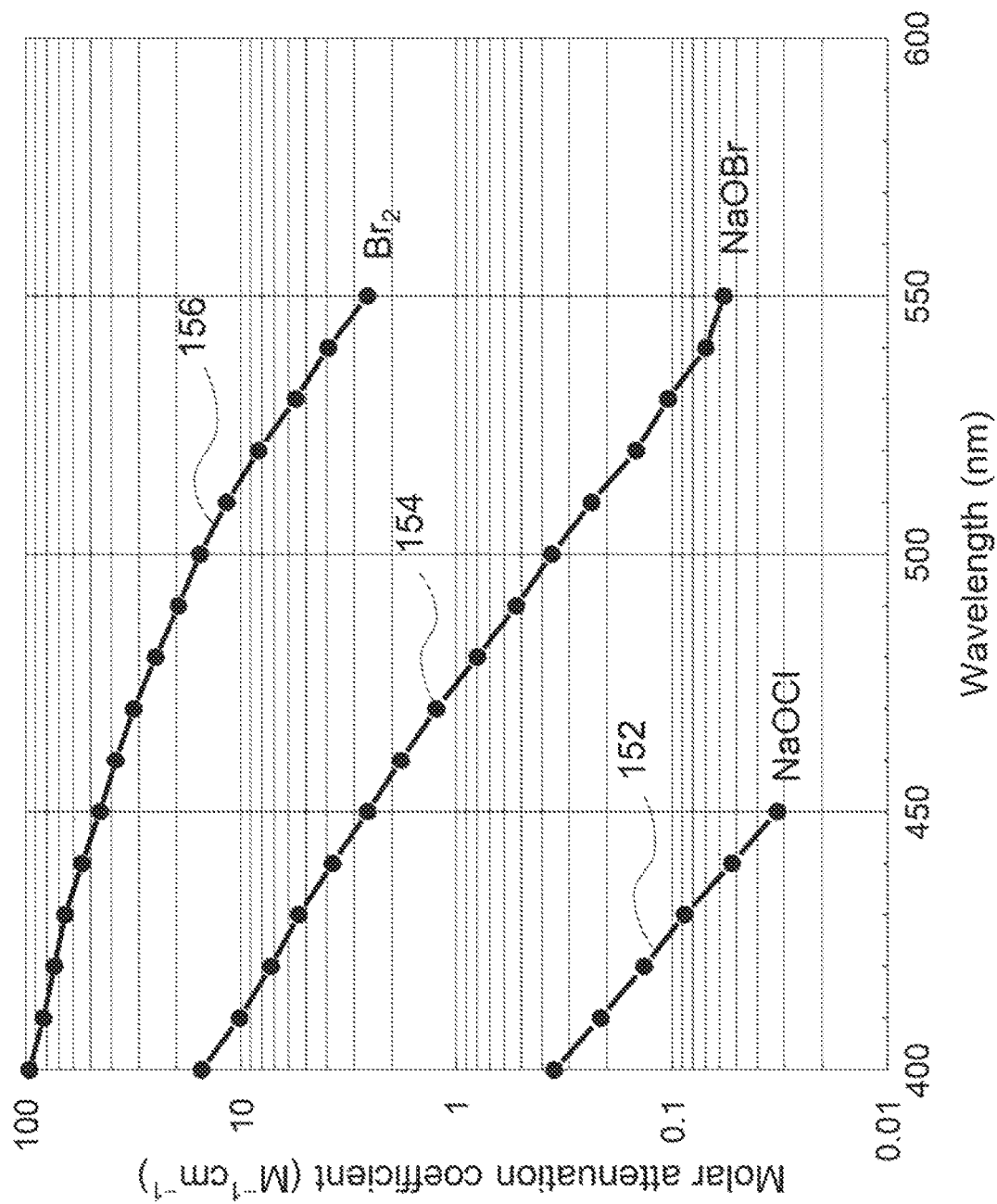
FIG. 4 is a graph illustrating the absorption spectra of NaOCl, NaOBr and $Br_2$ in the visible range.

Hypobromite ion ($OBr^-$) absorbs ultraviolet light strongly, and absorbance extends into the visible range where it is more easily measured. For example, FIG. 4 illustrates the absorption spectra of NaOCl, NaOBr and $Br_2$ in the visible range. "Molar attenuation coefficient ($M^{-1}$ $cm^{-1}$)" has the same numerical value as absorbance of a 1 Molar solution in a 1 cm spectroscopic cell. It is therefore possible to monitor replacement of $OCl^-$ by $OBr^-$ using a spectrophotometer or colorimeter to measure absorbance. The wavelength can be selected to give a convenient, easily measured reading over the range of concentrations of $OBr^-$ relevant to the specific application.

Figure 5:
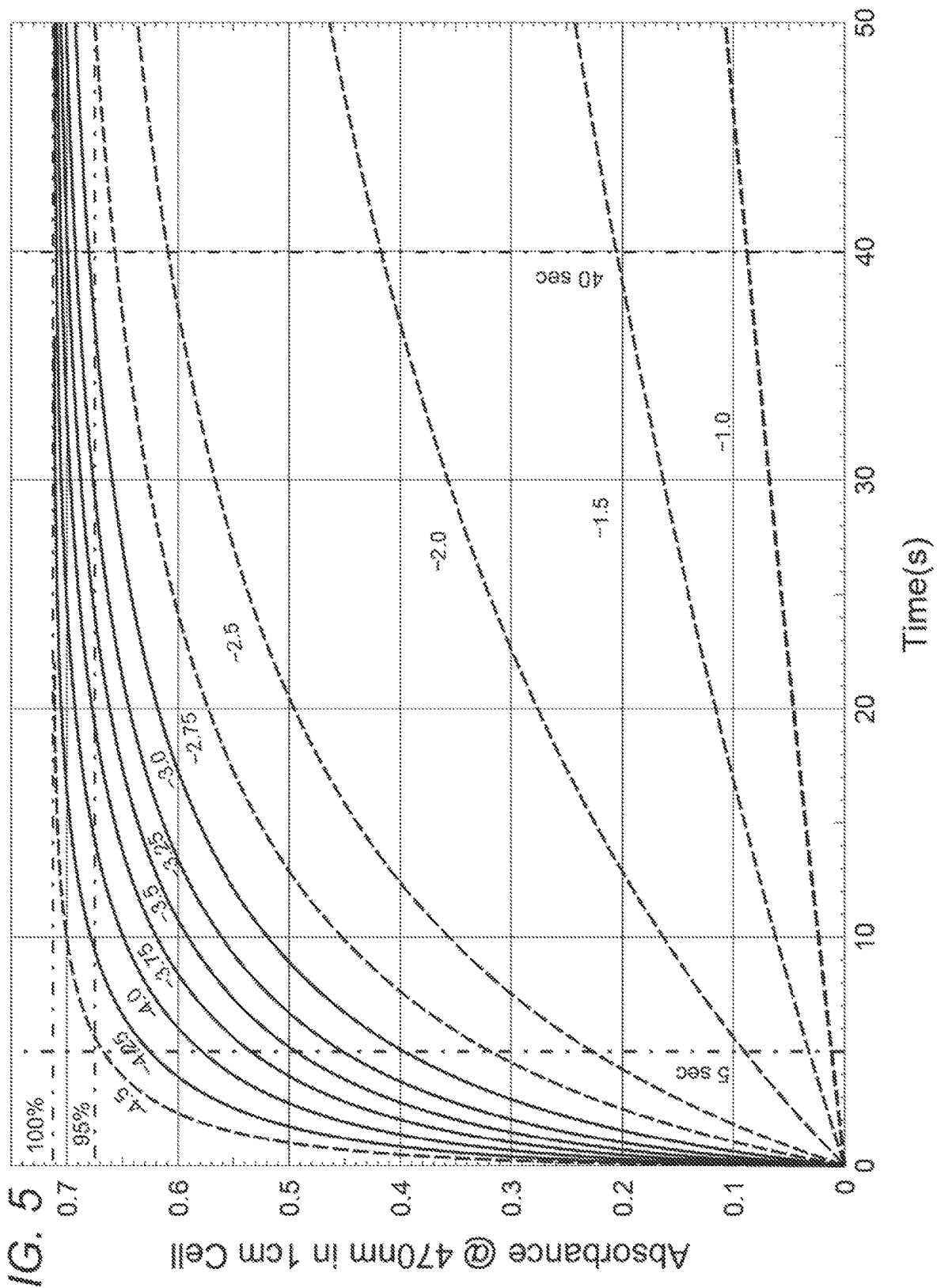
FIG. 5 is a graph illustrating the absorption as the reaction proceeds over time with various initial values of $m(OH^-)$.

FIG. 5 illustrates absorbance at 470 nm in a 1 cm cell as the reaction proceeds starting with various initial values of $m(OH^-)$. Each curve is labeled with the initial value of log $m(OH^-)$. The reacting solutions presented are the same as those in FIG. 1, i.e., 12.5% active chlorine bleach containing 10 g/liter NaOH, 40 w %/o NaBr and water in volume proportions 40:10:50 with the initial value of log $m(OH^-)$ adjusted by adding sulfuric acid. The absorbance is in each case proportional to Reaction Progress and the concentration of NaOBr in solution. The absorbance by unreacted is NaOCl is much weaker and can be ignored.

The amount of acid added to the reacting solution can be controlled by continuously measuring absorbance at the discharge of the pipe or reactor, or alternatively at some earlier point, and regulating pump output to as needed to keep absorbance within a predetermined range.

Measuring absorbance at the discharge of the pipe or reactor would give the most direct indication of the fraction of NaBr converted to NaOBr. However, it is not the most sensitive way to control acid feed, because overfeeding acid would cause only a small increase of absorbance at the discharge.

More precise control can be achieved by measuring absorbance at an earlier point, where only part of the NaBr has been converted to NaOBr, and where varying acid feed produces an easily measured change in absorbance. For example, maintaining absorbance at 5 seconds in the range 0.45 to 0.53 would give Reaction Progress 97.2 to 99.0% at 40 seconds while reliably preventing acid overfeed.

An additional advantage of measuring absorbance at an earlier point is that the optical cell can be located closer to pumps feeding the chemicals, and could be integrated into the pump skid or equivalent assembly. This is more convenient than measuring absorbance at the discharge which may be some distance away.

However, controlling acid feed by measuring absorbance could, in the case illustrated, include correlating Reaction Progress at 40 seconds (discharge of the pipe) with absorbance at 5 seconds. This correlation could be established by simultaneously measuring absorbance at 5 seconds and 40 seconds at several values of acid feed. Alternatively, it could be read off of a figure analogous to FIG. 5 generated for conditions specific to the application.

A malfunction whereby the bleach feed drops to the point that NaBr exceeds NaOCl in the reacting solution can be dangerous. In this case, NaOBr and NaBr would both be present in the solution discharged, and the pH would be much lower than intended, producing bromine (which is much more volatile than HOCl or HOBr) and hazardous fumes. Because $Br_2$ absorbs light much more strongly than HOBr, the absorbance reading would increase far above the value indicative of full conversion of NaBr to NaOBr.

Increased absorbance beyond a threshold or an increased rate of change of absorbance beyond a threshold could thus serve as an alarm.

If the water used to dilute the reacting solution contains calcium and bicarbonate, pH increases by adding bleach may cause $CaCO_3$ to deposit, fouling the optical windows or optical cell needed to measure absorbance. This problem can be controlled by adding an appropriate amount of one or more scale inhibitors to the reacting solution, chosen not to react with bleach; for example, phosphonobutanetricarboxylic acid (PBTCA) or polymaleic acid (PMA) which contain no nitrogen. If the actual acids are used, they will replace part of the acid needed to neutralize NaOH; solutions containing these acids partly or fully neutralized can also be used. The inhibitor can be added to the NaBr solution and therefore included in the NaBr feed, or can be added to the reacting solution as a separate stream.

If the water used to dilute the reacting solution is turbid, absorbance can also be measured before acid is added to the reacting solution, and this value subtracted from absorbance further downstream. Alternatively, absorbance can be measured at two points, and acid feed controlled based on the difference between absorbance values, analogous to measuring temperature at two points as described in Example 5 below.

Example 3

Predetermine or Control the Amount of Acid Added by Measuring pH

Because $m(OH^-)$ controls reaction rate, the process can be controlled by measuring pH and continuously adjusting acid feed rate to maintain pH within a predetermined range which corresponds to the fraction of NaBr converted to NaOBr desired.

Figure 6:
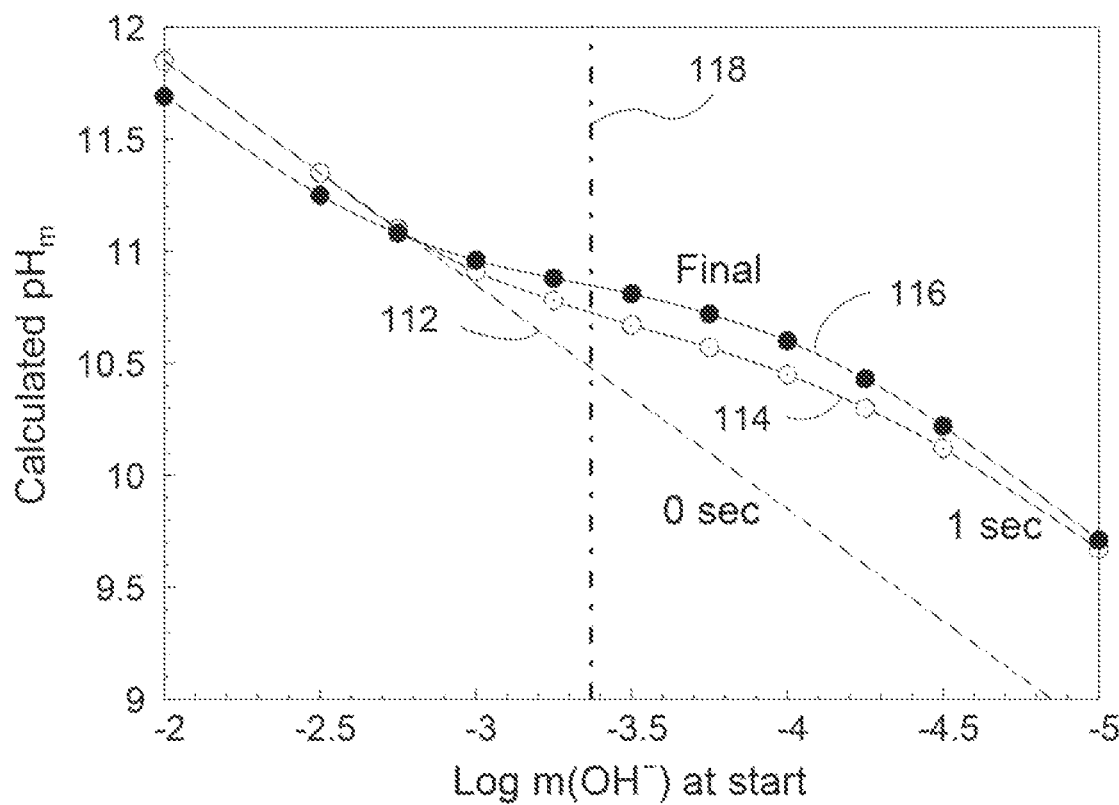
FIG. 6 is a graph illustrated the calculated value of $pH_m$ as a function of the initial value of log $m(OH^-)$.

Table 1 above and several Figures present values of $pH_m$ which is related to pH but generally not equal to pH. However, calculated values of $pH_m$ vary with composition of the reacting solution as do measured values of pH. FIG. 6 shows the calculated value of $pH_m$, (that is, $-\log m(H^+)$) as a function of the initial value of $\log m(OH^-)$; these values are from the same calculations as reported in FIG. 1, for example. Curve 112 represents the hypothetical initial value of $pH_m$ before reaction begins, curve 114 the value at 1 second later, and curve 116 after the reaction has run to completion. $pH_m$ increases as the reaction proceeds because HOBr is a weaker acid than HOCl, whereby more OH is produced by hydrolysis as $OBr^-$ replaces $OCl^-$. FIG. 6 shows that $pH_m$ (and therefore pH) changes quickly at the start of the reaction such that most of the increase occurs during the first second. The shape of curve 14 in FIG. 2A similarly reflects this change. Therefore, pH should be measured at a point downstream; for example, at a point where the solution has had one second or more to react.

Using pH as a control parameter requires establishing the relation of pH to the fraction of NaBr converted to NaOBr. The relationship between pH and fraction converted can be established by simultaneously measuring pH and concentration of NaOBr, not necessarily the same point or at the discharge. Concentration of NaOBr can be measured using a spectrophotometer or colorimeter as discussed in the preceding Example, but other methods can be used. The correlation of pH with fraction converted can be established at an actual installation in the field, or in the laboratory.

A pH probe that will endure prolonged contact with the alkaline, strongly oxidizing reacting solution should be used, for example, a traditional glass membrane electrode can be used. As noted in the preceding Example, the reacting solution may deposit $CaCO_3$ fouling the pH probe. Therefore, it may be necessary to add a scale inhibitor to the reacting solution, or include it in the solution of NaBr that is added.

Controlling the amount of acid added by measuring pH is simple in principle and would most directly control $pH_m$ and $m(OH^-)$.

Example 4

Predetermine the Amount of Acid by Measuring Temperature at the Discharge

Reaction (2) is the rate determining step, but Reaction (1) with $\Delta H=-32.6$ kJ/mol is the overall reaction. HOCl and HOBr are just intermediates in the strongly alkaline solution. The solution modeled contains 0.55 mols NaBr and 0.956 kg water per liter at the start. Therefore, complete reaction can be expected to increase temperature by about

$$\Delta T=32.6\times0.55/(0.956\times4.18)=4.5° \text{ C.} \tag{4}$$

The amount of acid needed to ensure practically complete reaction in a pipeline or other conduit that serves as a plug flow reactor can be predetermined at the start by slowly increasing the amount of acid added while measuring temperature at the discharge. A three part plot of T as a function of equivalents acid added can be obtained. At the start, with NaOH present in solution, the predominant reaction will be $$OH^-+H^-\rightarrow H_2O \tag{5}$$

with $\Delta H=-55.84$ kJ/eq acid added. As the concentration of $OH^-$ decreases, Reaction (1) will begin to contribute and slope will increase. As the last of the $OH^-$ is consumed and production of HOBr approaches completion, slope will decrease until finally the protonation of hypobromite predominates

$$OBr^-+H^+\rightarrow HOBr \tag{6}$$

with $\Delta H=-18.9$ kJ/eq acid added. The "sweet spot", where conversion of bromide to hypobromite is nearly complete will be located at the point where the slope stabilizes at $\Delta H=-18.9$ kJ/eq acid added.

This method can be used to determine acid feed rate when setting up the process, but may not be as reliable for continuous process control, because changes in bleach composition, chemical feed ratios, temperature of the chemical solutions and water blended, and heat exchange of the pipeline with the environment would change the relationship between temperature and Reaction Progress at the discharge. The procedure outlined above can be used to periodically determine and reset the optimal acid feed rate.

Example 5

Figure 7:
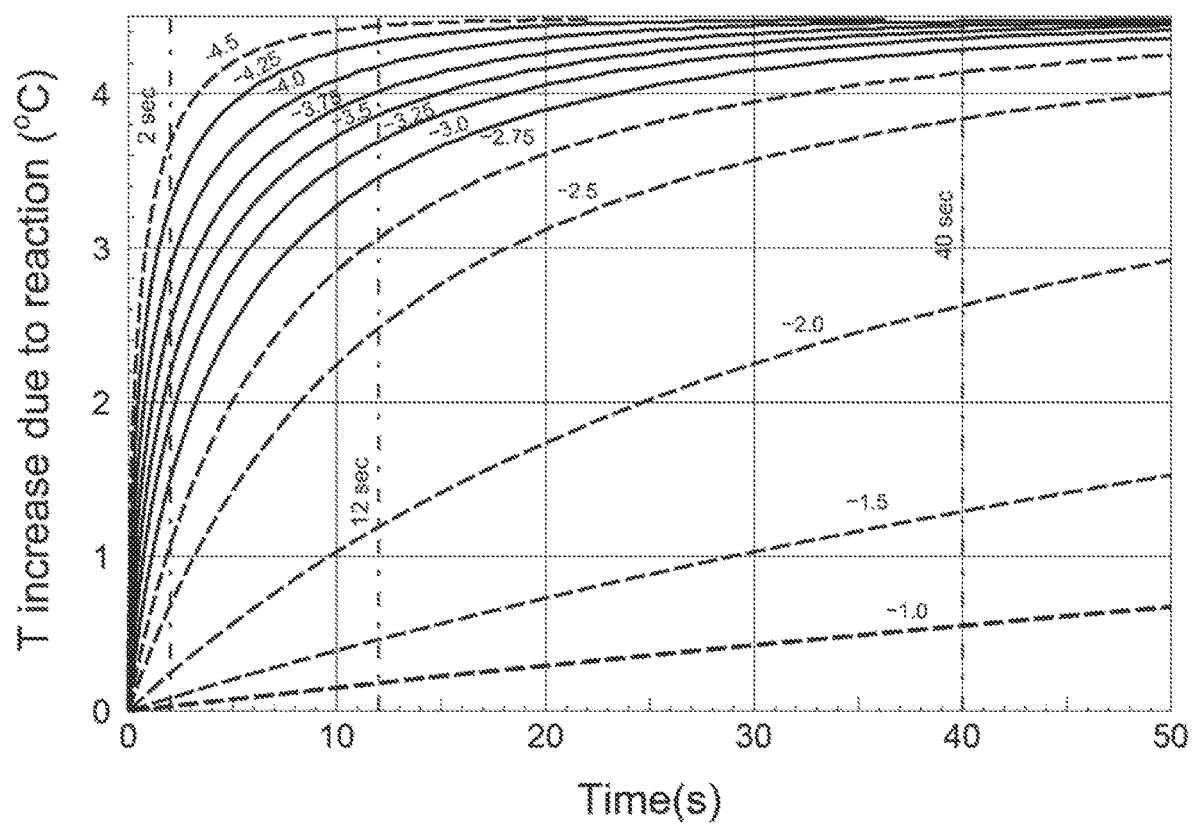
FIG. 7 is a graph illustrating the increase in temperature as the reaction proceeds over time with various initial values of $m(OH^-)$.

Control the Amount of Acid Added by Measuring Temperature at Two or More Points Continuous control of acid feed can be implemented by measuring temperature at two points along a conduit functioning as a plug flow reactor. FIG. 7 is the same as FIGS. 1 and 5, but plots temperature increase due to reaction of hypochlorite with bromide as a function of time instead of Reaction Progress or absorbance. In each case, there is also a smaller temperature increase related to neutralization of NaOH in the bleach, protonation of hypochlorite and heat of mixing of the solutions combined, but these contributions can be ignored, because each curve as a function of time is considered separately in calculations related to FIG. 7. In this case, the temperature increase as the reaction proceeds is important here, not the actual temperature.

The first T transducer can be located just after the chemicals and water have been combined and thoroughly mixed; for example, 1 to 4 seconds after adding acid, 2 to 4 seconds after adding acid, or at 2 seconds after adding acid as shown in FIG. 7. At this point, T increase associated with neutralization reactions is complete, and T increase associated with production of hypobromite has just started. A second T transducer is located further downstream, at a point where Reaction Progress is significant; for example, at 5 seconds or more after adding acid, from 10 seconds to 25 seconds after adding acid, or at 12 seconds in FIG. 7. Acid feed can be regulated to maintain a certain preset difference between the two T values measured. Locating the second T transducer further downstream, where the reaction approaches completion, would make the temperature difference larger and therefore easier to measure, but would increase error associated with heat exchange between the conduit and ambient environment. Therefore, it is preferred that the second T transducer also be located not far from the entrance of the conduit. Ideally, the part of the conduit between the two points temperature is measured should be insulated.

Figure 8A:
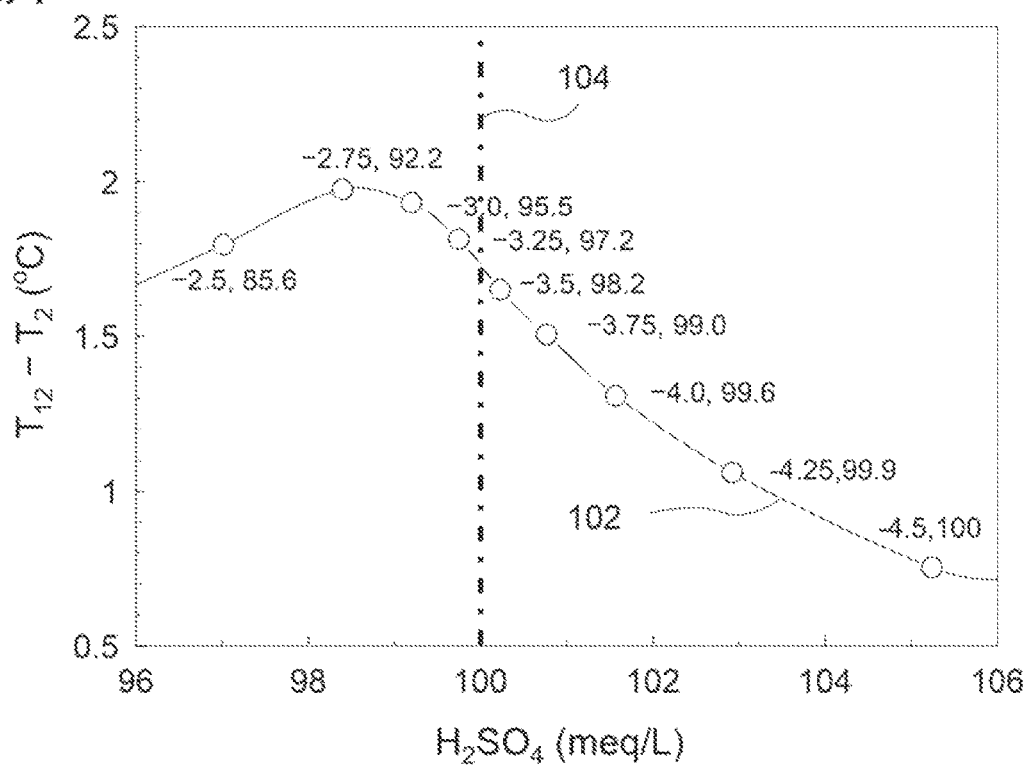
FIGS. 8A-8B are graphs respectively illustrating the temperature increase and vapor pressure increase that occurs between 2 seconds and 12 seconds of reaction based on varying amounts of added acid.
Figure 8B:
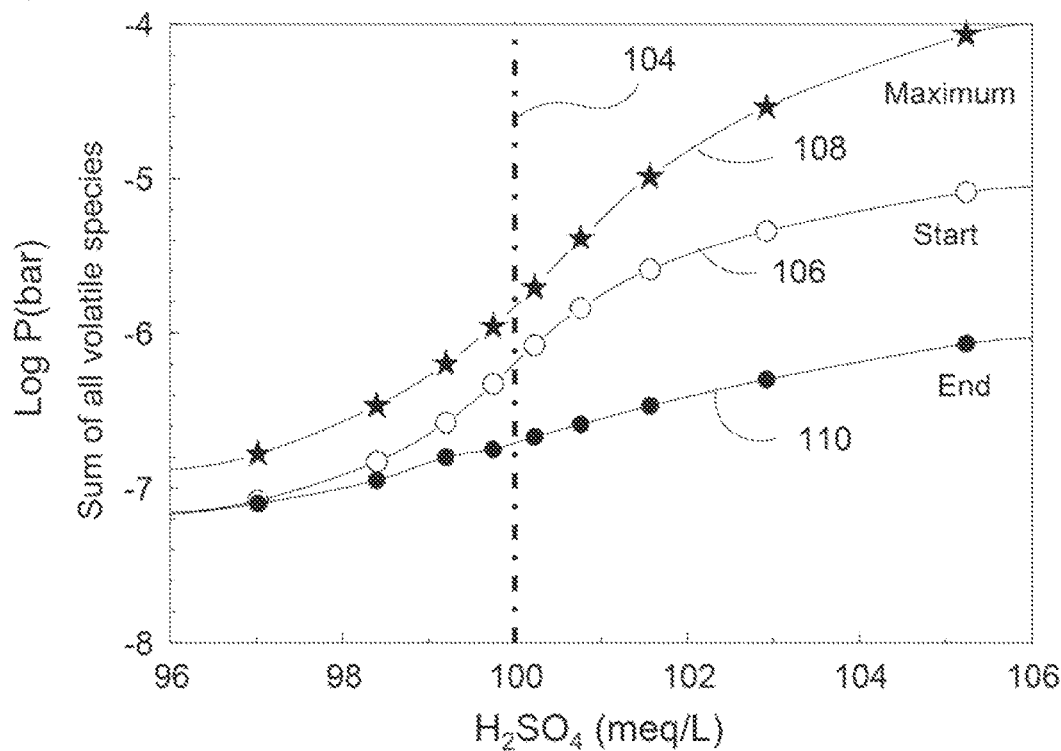

FIG. 8A shows the temperature increase 102 that occurs between 2 seconds and 12 seconds after the bleach, NaBr, water and acid have been combined. Each data point in FIG. 8A corresponds to a curve in FIG. 7, and is labeled with the corresponding initial value of log m(OH$^-$) and Percent Reaction Progress at 40 seconds reaction time. Broken vertical line 104 indicates the amount of acid needed to neutralize NaOH introduced with the bleach. Initially, $T_{12}-T_2$ increases with the amount of acid added because T at 12 seconds increases more rapidly than T at 2 seconds. But as more acid is added, the rate of increase at 2 seconds overtakes the rate at 12 seconds, and $T_{12}-T_2$ decreases.

Initial value of log m(OH$^-$) between −3.0 and −4.0 corresponds to reaction progress 95.5 to 99.6% at 40 seconds respectively. Throughout this interval ΔT decreases with increasing amount of acid added; broken vertical line 104 indicates the point at which acid added just neutralizes NaOH introduced with the bleach.

Because increasing the amount of acid increases the rate of reaction and the amount of heat generated by the reaction, it is surprising and unexpected that the "sweet spot" should occur within the region wherein $T_{12}-T_2$ decreases (that is, the slope of curve 102 is negative) as more acid is added. The decrease is very nearly linear as a function of acid added, which renders programming a controller to maintain a predetermined value of $T_{12}-T_2$ is straightforward.

Thermocouples, platinum resistance probes, thermistors or other temperature transducers can be used, and the two transducers used can be carefully matched, or the difference between them measured and used to correct the difference between the two temperature values recorded.

FIG. 8B shows summed vapor pressure of volatile species 106 before reaction begins, maximum vapor pressure 108 as the reaction proceeds, and final vapor pressure 110 after the reaction has run to completion. The major volatile species at the start 106, maximum 108, and end 110 are HOCl, Br$_2$ and HOBr respectively. The value 106 before reaction begins is hypothetical because the reaction begins before mixing of solutions is complete. However, mixing bleach, water, acid and NaCl in place of NaBr would give vapor pressure nearly equal to 106. As evident in FIG. 2B maximum value 108 is encountered very shortly after the reaction begins. At the point of maximum vapor pressure 108 shortly after start of the reaction Br$_2$ predominates, and at the end of the reaction 110 when Br$^-$ is fully consumed HOBr predominates. The maximum value shortly after start of reaction is due to maximum concentration of Br$_2$ in solution at this point, which is also evident in FIGS. 2B and 2D.

Example 6

Run the Reaction Using Two or More Perfectly Stirred Reactors

Figure 9A:
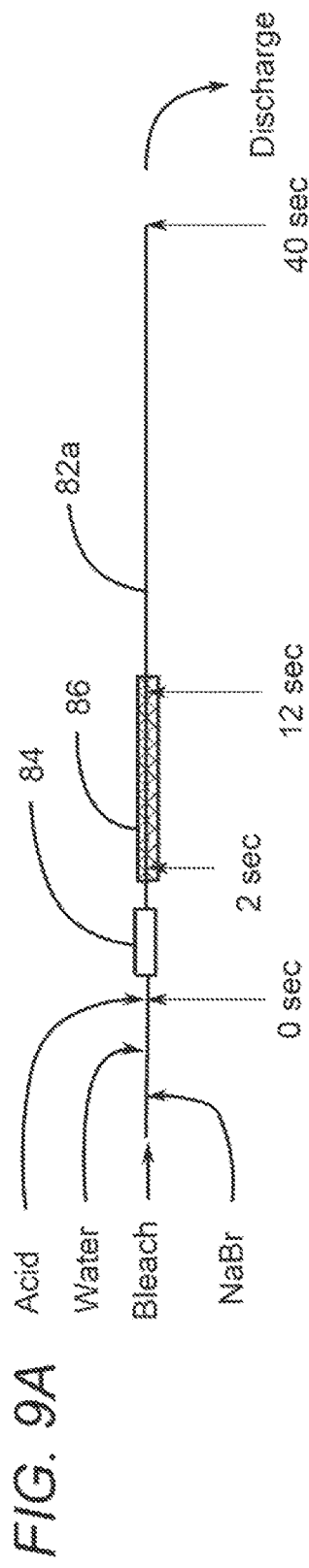
FIGS. 9A-9C are schematic diagrams illustrating embodiments of reaction systems.
Figure 9B:
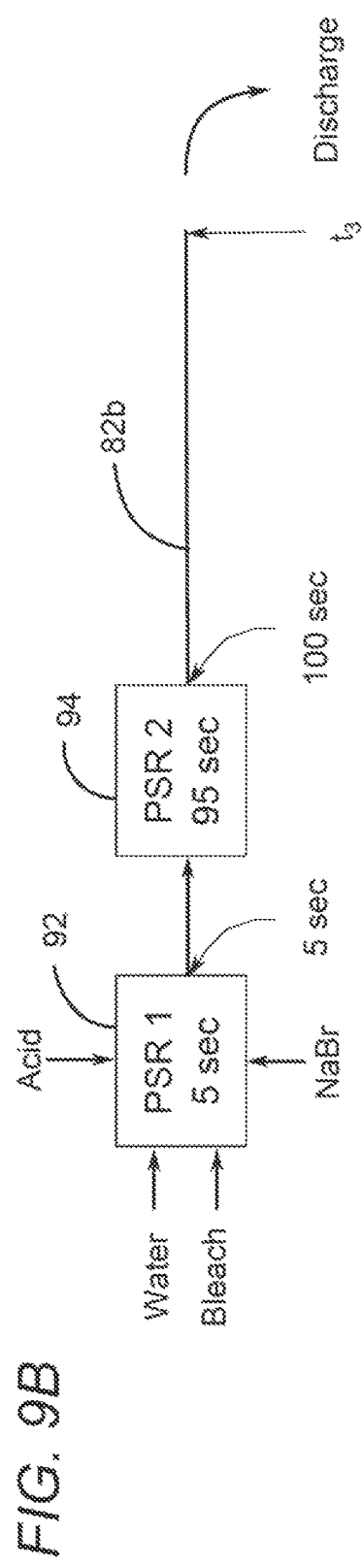
Figure 9C:
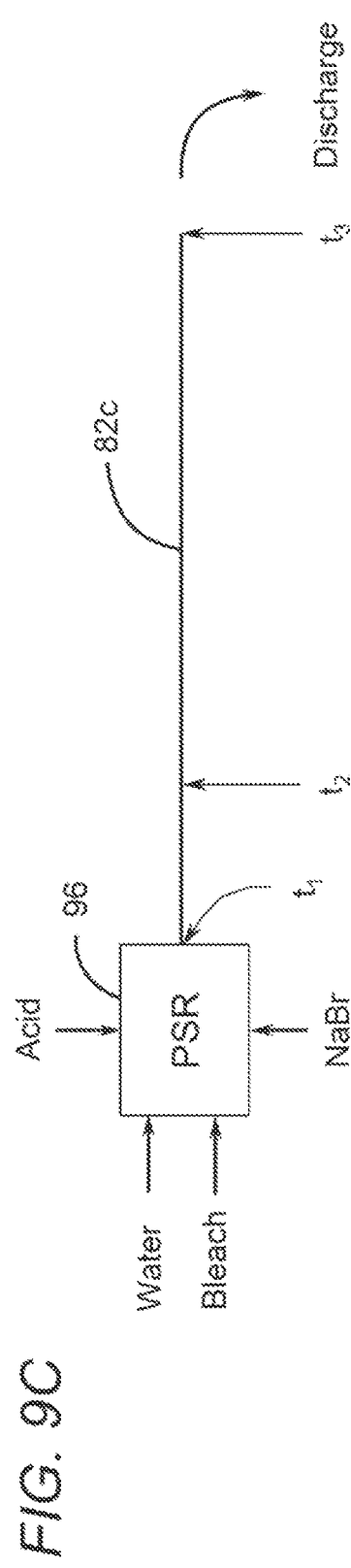

The two-temperature control method of Example 5 measures the temperature soon after the start of the reaction; for example, at 2 seconds as in Example 5. That value may vary due to variation in rate of mixing, flow rate, etc., degrading the quality of process control that can be achieved. FIGS. 9A-C illustrate practical systems considered and modeled.

FIG. 9A shows a system where the reaction takes place in plug flow mode along pipeline or hose 82a with in-line mixer 84, and thermal insulation 86.

FIG. 9B shows two perfectly stirred reactors 92 and 94 in series. Pipeline or hose 82b may optionally provide additional time for reaction. Because the first PSR can be designed to provide mixing time that is small in relation to residence time in that reactor, the effect of variations in mixing rate is minimized. Also, the PSRs are compact units characterized by small surface to volume ratio; therefore, heat transfer with the ambient environment will be small, and easily controlled by insulating the units. The two temperature control method is easily implemented in a system of two PSRs.

FIG. 10 illustrates temperature increases due to chemical reaction in the system of two perfectly stirred reactors as shown in FIG. 9B. The composition and proportions of chemical solutions combined are the same as in FIGS. 1, 5 and 7. Curve 122 shows the temperature increase leaving PSR 1 at 5 seconds, curve 124 shows the total temperature increase (that is, from start of reaction) leaving PSR 2 at 100 seconds, and curve 126 shows the temperature increase within PSR 2, i.e., the difference between curves 124 and 122, all as a function of the amount of sulfuric acid added. Broken vertical line 104 indicates the amount of acid needed to neutralize NaOH introduced with the bleach (100 meq/liter of the reacting solution). Broken horizontal line 130 indicates temperature increase corresponding to 95% Reaction Progress. As in FIG. 7, the values of temperature increase plotted are just those arising from reaction of bromide with hypochlorite; temperature increases related to neutralization of NaOH and protonation of hypochlorite and hypobromite are the same for curves 122 and 124, and cancel out in calculating curve 126. Each data point along curve 126 is labeled with the value of log m(OH$^-$) and Reaction Progress (that is, percentage of bromide reacted) at that point. Each point is labeled with the initial value of log m(OH—) and percent Reaction Progress leaving PSR 2. Like curve 102 in FIG. 8A, curve 126 has negative slope in the range of Reaction Progress >83%, the region most relevant to practical application of the invention and process control.

Figure 11:
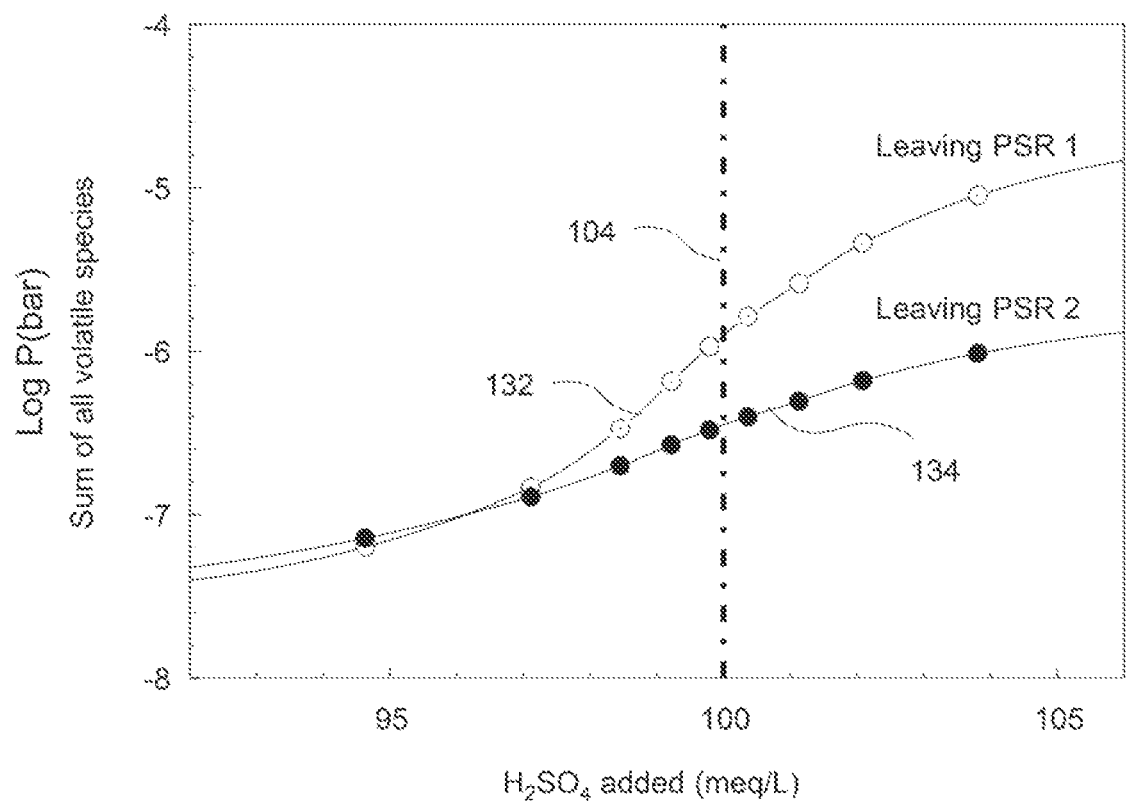
FIG. 11 is a graph illustrating the total vapor pressure of volatile species in solution exiting the two reactors of FIG. 9B.

FIG. 11 illustrates the total vapor pressure of volatile species in solution leaving PSR 1 (curve 132) and leaving PSR 2 (curve 134). The major volatile species leaving PSR 1 and PSR 2 are Br$_2$ and HOBr, respectively. Vapor pressure leaving PSR 1 is much higher than leaving the second PSR, because partial reaction favors the presence of Br$_2$. Broken vertical line 104 indicates the amount of acid needed to neutralize NaOH introduced with the bleach (100 meq/liter of the reacting solution).

Figure 12:
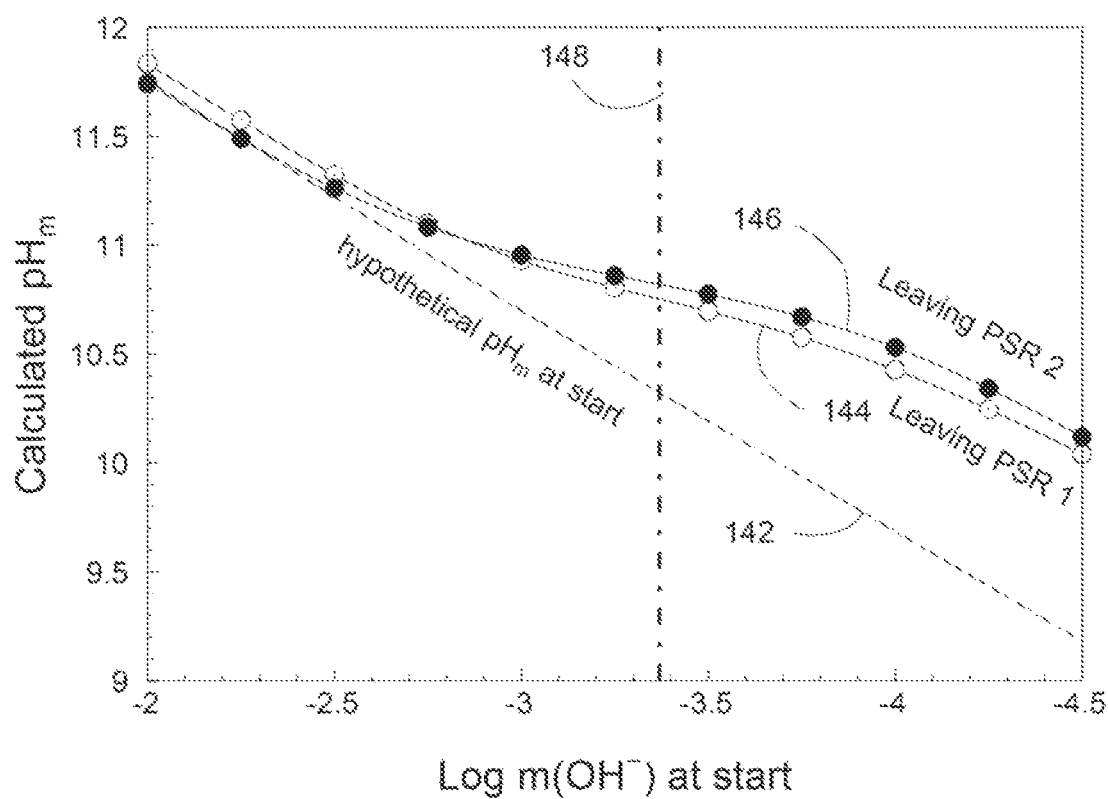
FIG. 12 is a graph illustrating the calculated value of pH, of the reaction mixture exiting the two reactors of FIG. 9B.

FIG. 12 illustrates the calculated value of $pH_m$ (that is, $-\log m(H^+)$) before reaction begins (curve 142), leaving PSR 1 (curve 144), and the value of $pH_m$ leaving PSR 2 (curve 146), all as a function of the initial value of log $m(OH^-)$. Most of the change in $pH_m$ occurs in PSR 1. Vertical line 148 indicates the value of log $m(OH^-)$ ($-3.37$) when 100 meq/liter is added to neutralize NaOH.

Example 7

Combine Perfectly Stirred and Plug Flow Reactor Stages

FIG. 9C shows a single perfectly stirred reactor 96 followed by a pipeline or hose 82c which provides additional time for reaction under Plug Flow conditions. Problems associated with unreliable first temperature measurement can be remedied with this embodiment by using a single, small PSR before continuing the reaction in a plug flow reactor. The PSR provides faster and more reliable mixing of the chemicals and water than would the Inline Mixer illustrated in FIG. 9A.

Example 8

Amount of Acid Added Predetermined by Modeling the Reaction

FIG. 9A illustrates a system where the reaction takes place under plug flow reactor conditions. Bleach, NaBr, water and acid are combined to produce a reacting solution which flows through a pipe, hose or other conduit. In this case, the proper amount of acid to add can be predetermined by generating curves describing Reaction Progress like those illustrated in FIG. 1, selecting which curve gives the desired fraction of NaBr converted in the time available for reaction, and adding the amount of acid that will give the value of log $m(OH^-)$ corresponding to that curve. Reaction Progress as a function of time will depend on the composition and proportions of chemicals combined; therefore, the computations should generally be performed and curves generated for the specific conditions of interest.

The combined rate of Reactions (1) and (2) which convert bromide to hypobromite may be written as:

$$d\,m(Hb)/dt = d\,m(Cl^-)/dt = -d\,m(Br^-)/dt = -d\,m(Hc)/dt = [k_{OCl^-}m(OCl^-) + k_{HOCl}m(HOCl)]m(Br) \quad (7)$$

where m(Hc) and m(Hb) are the total concentrations of hypochlorite and hypobromite, respectively:

$$m(Hc) = m(HOCl) + m(OCl^-)$$

$$m(Hb) = m(HOBr) + m(OBr^-)$$

The values of the rate constants at 25° C. in 0.5M $NaClO_4$ are $$k_{OCl^-} = 0.0009\,M^{-1}\,s^{-1} \quad (7a)$$

$$k_{HOCl} = 1{,}550\,M^{-1}\,s^{-1} \quad (7b)$$

See, e.g., K. Kumar et al., "Kinetics and Mechanism of General Acid-Assisted Oxidation of Bromide by Hypochlorite and Hypochlorous Acid. Inorg. Chem.," vol. 26, pp. 2706-2711 (1987), which is incorporated by reference herein.

Assuming that the numerical values of these rate constants expressed in terms of molality is the same and using them in Eq. (3) introduces little error. The value of $k_{OCl^-}$ will increase with ionic strength, but the contribution of that term will remain small and have little practical significance. However, the value of $k_{HOCl}$ will be little effected by ionic strength and the effect of temperature will likewise be small over the range of practical interest.

The reaction is subject to general acid catalysis. The rate constant describing catalysis by bicarbonate is presented in the aforementioned publication by Kumar et al., and rate constants for additional acidic species can be calculated using Eq. (14) in that reference. If bicarbonate or another such species is present in the solution, additional terms can be added to Eq. (3) representing its contribution to the reaction rate.

Reaction Progress as illustrated in FIG. 1 can be calculated by integrating Eqn. (7) as a function of time. So doing requires calculating the concentrations of $OCl^-$ and HOCl in the solution as the reaction proceeds.

HOCl and $OCl^-$ are related by the reaction $$HOCl + OH^- \rightarrow OCl^- + H_2O \quad (8a)$$

with equilibrium constant expressed in terms of molal units $$Q_{HOCl} = m(OCl^-) a_w / [m(OH^-) m(HOCl)] \quad (8b)$$

where, to a good approximation $$\log Q_{HOCl} = pK_w - pK_a(HOCl) \quad (8c)$$

$pK_w$ is the minus the logarithm of the equilibrium constant for dissociation of water,
$pK_a(HOCl)$ is the minus the logarithm of the equilibrium constant for dissociation of HOCl,
$a_w$ is the activity of water,
and concentration values are in molal units.

$$m(OCl^-) = m(Hc)(Q_{HOCl}/a_w)m(OH^-)/[(Q_{HOCl}/a_w)m(OH^-) + 1] \quad (8d)$$

$$m(HOCl) = m(Hc) - m(OCl^-) = m(Hc)/[(Q_{HOCl}/a_w)m(OH^-) + 1] \quad (8e)$$

Equations of the same form describe the equilibrium of $OBr^-$ and HOBr, using $Q_{HOBr}$ and m(Hb) in place of $Q_{HOCl}$ and m(Hc).

These reactions are more conveniently and reliably described in terms of $m(OH^-)$ rather than $m(H^+)$ because reaction (8a) is isocoulombic, whereby the effect of ionic strength is small and $Q_{HOCl}$ expressed in terms of molality is approximately equal to the true equilibrium constant in terms of activity whereby Eq. (8d) is a good approximation.

The values of $pK_w$, $pK_a$ of HOCl, and $pK_a$ of HOBr can be calculated using formulas and tables respectively presented in the following references (i) 2. R. H. Busey et al., "The Ionization of Water in NaCl Media to 300° C.," J. Solution Chem., v.5, pp. 147-152 (1976); (ii) J. Carrell Morris, "The Acid Ionization Constant of HOCl from 5 to 35°," J. Phys. Chem., 70:12, pp. 3798-3805 (1966); and (iii) C. M. Kelley and H. V. Tartar, "On the System: Bromine-Water," J. Am. Chem. Soc., 78:22, pp. 5752-5756 (1956). These values, and the values of log Q for HOCl and HOBr are presented in the table below.

|  |  | HOCl | | HOBr | |
| --- | --- | --- | --- | --- | --- |
| T(C) | $pK_w$ | $pK_a$ | $\log Q_{HOCl}$ | $pK_a$ | $\log Q_{HOBr}$ |
| 0 | 14.94 | 7.82 | 7.12 | 9.32 | 5.62 |
| 5 | 14.73 | 7.75 | 6.97 | 9.13 | 5.60 |
| 10 | 14.53 | 7.69 | 6.84 | 8.96 | 5.56 |
| 15 | 14.34 | 7.63 | 6.71 | 8.83 | 5.51 |

| T(C) | pK$_w$ | HOCl | | HOBr | |
|---|---|---|---|---|---|
| | | pK$_a$ | log Q$_{HOCl}$ | pK$_a$ | log Q$_{HOBr}$ |
| 20 | 14.16 | 7.58 | 6.58 | 8.72 | 5.44 |
| 25 | 13.99 | 7.54 | 6.46 | 8.63 | 5.36 |
| 30 | 13.83 | 7.50 | 6.34 | 8.55 | 5.28 |
| 35 | 13.68 | 7.46 | 6.22 | 8.49 | 5.19 |
| 40 | 13.54 | 7.43 | 6.10 | 8.44 | 5.10 |
| 45 | 13.40 | 7.41 | 5.99 | 8.39 | 5.01 |
| 50 | 13.27 | 7.39 | 5.88 | 8.35 | 4.92 |

The value of aw in a mixture of bleach and NaBr is approximately equal to aw in a solution of NaCl of equal ionic strength, which can readily be calculated using values of osmotic coefficient presented in Ref. 5 and elsewhere.

The initial state of the solution comprising bleach, NaBr and water is conveniently described as follows. Based on information provided by the supplier or analysis by the user, the composition of one liter of bleach can be expressed as $$h(\text{mols})\text{NaOCl} + s(\text{mols})\text{NaCl} + c(\text{mols})\text{NaOH} + w_1(\text{kg})\text{H}_2\text{O} \quad (9a)$$

and the composition of one liter of NaBr solution can expressed as $$b(\text{mols})\text{NaBr} + w_2(\text{kg})\text{H}_2\text{O} \quad (9b)$$

Bleach, NaBr and water are combined in the proportions $$D(L)\text{Bleach} + E(L)\text{NaBr} + F(L)\text{H}_2\text{O} \quad (9c)$$

In the mixture, Total H$_2$O = $W = Dw_1 + Ew_2 + F$ (9d)

Total initial concentration of hypochlorite=
$$m_0(\text{HOCl}) + m_0(\text{OCl}^-) = m_0(\text{Hc}) = Dh/W \quad (9e)$$

Total initial concentration of hypobromite=$m_0$(HOBr)+$m_0$(OBr$^-$)=$m_0$(Hb)=0, and the unvarying concentration of sodium in the mixture is $$m(\text{Na}^+) = ((h+s+c)D + bE)/W \quad (9f)$$

The values of m(Hb) and m(Cl$^-$) increase as Reaction (2) proceeds, while the values of m(Hc) and m(Br$^-$) decrease at the same rate (Eq. 7 above). The value of m(OH$^-$) increases, because HOBr is a weaker acid than HOCl, whereby OBr$^-$ hydrolyzes to a greater extent than OCl$^-$, producing more OH$^-$. The value of m(OH$^-$) is calculated as the reaction proceeds by numerically solving the charge balance equation $$0 = m(\text{H}^+) + m(\text{Na}^+) - m(\text{OH}^-) - m(\text{Cl}^-) - m(\text{Br}^-) - m(\text{OCl}^-) - m(\text{OBr}^-) \quad (10)$$

where m(OCl$^-$) and m(OBr$^-$) are calculated using equation (4d) and the corresponding expression that governs m(OBr$^-$). The first term, which is very small, can be set to zero. Carbonate may be present in the bleach used, and carbonate and bicarbonate can be present in the reacting solution when carbon dioxide or sodium bicarbonate is used to adjust m(OH$^-$). In this case, terms representing the contribution of carbonate and bicarbonate should be added to the equation:

$$0 = m(\text{H}^+) + m(\text{Na}^+) - m(\text{OH}^-) - m(\text{Cl}^-) - m(\text{Br}) - m(\text{OCl}^-) - m(\text{OBr}^-) - m(\text{HCO}_3^-) - 2m(\text{CO}_3^{-2}) \quad (10a)$$

If the volume of water added is large in relation to the volume of bleach, solutes present in the water (for example, silica or ions other than Na$^+$ and Cl$^-$) will also affect the charge balance and calculated value of m(OH—). Terms representing these species in ionic form should be added to the charge balance equation if numerically significant.

The number of equivalents of acid or alkali that must be added to induce the desired initial value of m(OH—) can be calculated as follows.

$$\text{Alkalinity with no acid added} = \text{Alk}_0(\text{eq/kg-H}_2\text{O}) = D(h+c)/W \quad (11)$$

The value of Alkalinity with acid added needed to provide the desired value of m(OH$^-$) will be $$\text{Alk}(\text{eq/kg-H}_2\text{O}) = [Qm(\text{OH}^-)^2 + (Qm(\text{Hc})+1)m(\text{OH}^{-1})]/(Qm(\text{OH}^-)+1) \quad (12)$$

where Q=(Q$_{HOCl}$/a$_w$)

To provide this value of Alkalinity add equivalents of sulfuric or another strong acid $$G(\text{eq}) = (\text{Alk}_0 - \text{Alk})W \quad (13)$$

Use of anhydrous acid, undiluted by water, is assumed; the derivation is easily extended to describe using a solution of acid in water.

The value of m(OH$^-$) as a function of Alkalinity can then be calculated by solving this quadratic equation:

$$Qm(\text{OH}^-)^2 + [Q(m(\text{Hc}) - \text{Alk}) + 1]m(\text{OH}^-) - \text{Alk} = 0 \quad (14)$$

Example 9

The amount of acid needed to provide the rate of reaction and reaction yield desired can also be determined, at least approximately, by consulting Figures which depict reaction rate or progress (the ones in this patent or analogous to them) or tables that contain similar information, on paper or in electronic form.

Example 10

Limit the Amount of Acid Added by Calculating Vapor Pressure of Volatile Species Adding more acid than necessary to achieve practically complete conversion of bromide to hypobromite can increase the vapor pressure of volatile species (primarily HOBr, HOCl and Br$_2$) unnecessarily, possibly creating a safety hazard. When conversion of bromide is practically complete—the condition of major interest—HOBr and HOCl predominate, and the vapor pressure of these species is easy to calculate. Doing this calculation provides a safety check, by allowing maximum permissible acid feed rate to be determined.

$$P_{HOCl} = K_H(\text{HOCl})m(\text{HOCl}) \quad (15a)$$

$$P_{HOBr} = K_H(\text{HOBr})m(\text{HOBr}) \quad (15b)$$

where the respective Henry's Law Constants in units of (bar/molal) may be calculated using:

$$K_H(\text{HOCl}) = \text{antilog}(-2204.5/T + 4.564) \quad (15c)$$

$$K_H(\text{HOBr}) = \text{antilog}(-2204.5/T + 4.2525) \quad (15d)$$

Values at 20° C. are given in W. F. McCoy et al., "Hypohalous acid and haloamine flash off in industrial evaporative cooling systems," Technical paper number TP90-09, Cooling Tower Institute 1990 annual meeting, Cooling Technology Institute, Houston, TX, 1990, which is incorporated by reference herein. The temperature dependence of K$_H$(HOCl) was calculated using enthalpy values in D. D. Wagman et al., "The NBS tables of chemical thermodynamic properties Selected values for inorganic and C1 and C2 organic substances in SI units," J Phys. Chem. Ref Data, Volume 11, Supplement No. 2 (1982), which is incorporated

Example 11

Limit the Amount of Acid Added by Measuring Volatile Species

Amperometric sensors are available to measure HOCl, HOBr, $Br_2$ and $Cl_2$ in air or water. A sensor of this kind can be installed at the discharge, and will give a quantitative indication of volatile species in the solution being discharged, or at the point where maximum summed vapor pressure is expected. It can be used to detect an unsafe concentration of volatile species. The sensor can detect neutral molecules diffusing through a plastic membrane; therefore, it will respond only to the volatile molecules, not to ions present.

The amount of acid added can be limited to ensure that summed vapor pressure of potentially hazardous volatile species at the discharge does not exceed $10^{-2}$ bar, or $10^{-3}$ bar, $10^{-4}$ bar, $10^{-5}$ bar, or $10^{-6}$ bar. The amount of acid added can be limited to ensure that summed vapor pressure of potentially hazardous volatile species at its maximum or at any point in the process does not exceed $10^{-2}$ bar, or $10^{-3}$ bar, $10^{-4}$ bar, $10^{-5}$ bar, or $10^{-6}$ bar.

What is claimed is:

1. A method for producing hypobromite comprising:
    combining together bromide, hypochlorite, and acid to provide a reaction mixture, wherein the acid is included in a sufficient amount so that the reaction mixture has an initial value of log m(OH⁻) that is in a range from −2 to −5; and
    reacting the reaction mixture to form hypobromite.

2. The method of claim 1, wherein the hypochlorite is added as bleach, and wherein the bleach further includes a base.

3. The method of claim 1, wherein the reaction mixture has an initial value of log m(OH³¹) that is in a rage of from −3 to −5.

4. The method of claim 2, further comprising determining an amount of acid to combine in the reaction mixture based on an amount of the base that is present in the bleach.

5. The method of claim 1, further comprising determining an amount of acid to combine in the reaction mixture based on a measured parameter that is indicative of at least one of a rate of reaction and reaction progress.

6. The method of claim 1, wherein the reaction mixture is reacted so that at least 70% of the bromide is converted to hypobromite.

7. The method of claim 1, wherein the bromide is combined in the reaction mixture as an aqueous solution of bromide salt.

8. The method of claim 1, wherein the acid is selected from at least one of sulfuric acid, carbon dioxide, and bicarbonate.

9. The method of claim 6, wherein the reaction mixture is reacted so that at least 90% of the bromide is converted to hypobromite.

10. The method of claim 4, wherein the acid is included in a sufficient amount so that the reaction mixture has an initial value of log m(OH⁻) that is in a range of from −3 to −4.5.

11. The method of claim 10, wherein the amount of acid is included in an equivalent amount of an amount of the base that is introduced with the bleach.

12. The method of claim 2, wherein the amount of acid is included so that a summed vapor pressure of volatile species HOCl, HOBr, $Cl_2$, $Br_2$, and BrCl during the reaction does not exceed $10^{-4}$ bar.

13. The method of claim 1, wherein the acid included in the reaction mixture is effective to accelerate the reaction and increase the yield of hypobromite.

14. A method for producing hypobromite in a reactor, the method of comprising:
    adding bromide, bleach, and acid to the reactor as a reaction mixture, wherein the bleach includes a base;
    reacting the reaction mixture to form hypobromite in a reacted mixture;
    measuring a parameter of the reaction mixture that is indicative of at least one of a rate of reaction and reaction progress; and
    controlling an amount of acid that is added to the reactor based on the measured parameter and so that the $pH_m$ of the reacted mixture is in a range of from 11.69 to 9.71.

15. The method of claim 14, wherein the measured parameter is absorbance of the reaction mixture.

16. The method of claim 14, wherein the measured parameter is a temperature change of the reaction mixture.

17. The method of claim 14, wherein the measured parameter is vapor pressure of at least one volatile species.

18. The method of claim 14, wherein the measured parameter is pH, and wherein the $pH_m$ of the reacted mixture is in a range of from 10.96 to 10.22.

19. The method of claim 14, wherein the reactor includes a conduit that acts as a plug flow reactor.

20. The method of claim 14, wherein the reactor includes a stirred reactor.

21. The method of claim 14, wherein the amount of acid is included so that the $pH_m$ of the reacted mixture is in a range of from 10.96 to 10.22.

* * * * *